US012289655B2

(12) United States Patent
Zohoorian et al.

(10) Patent No.: US 12,289,655 B2
(45) Date of Patent: *Apr. 29, 2025

(54) DETERMINING LOCATION BASED ON DYNAMIC PATH LOSS EXPONENT (PLE) AND INTERCEPT (INT) ESTIMATION

(71) Applicant: Juniper Networks, Inc., Sunnyvale, CA (US)

(72) Inventors: Mohammad Zohoorian, San Francisco, CA (US); Robert D. Berry, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,277

(22) Filed: May 31, 2024

(65) Prior Publication Data

US 2024/0406682 A1    Dec. 5, 2024

Related U.S. Application Data

(63) Continuation of application No. 17/453,752, filed on Nov. 5, 2021, now Pat. No. 12,004,045.

(Continued)

(51) Int. Cl.
*H04W 4/029* (2018.01)
*G01S 5/02* (2010.01)
*H04W 24/08* (2009.01)

(52) U.S. Cl.
CPC .......... *H04W 4/029* (2018.02); *G01S 5/0278* (2013.01); *H04W 24/08* (2013.01)

(58) Field of Classification Search
None
See application file for complete search history.

(56) References Cited

U.S. PATENT DOCUMENTS 9,729,439 B2    8/2017    MeLampy et al.
9,729,682 B2    8/2017    Kumar et al.
(Continued)

FOREIGN PATENT DOCUMENTS

| EP | 3033632 A1 | 6/2016 |
| WO | 2015022149 A1 | 2/2015 |
| WO | 2016176670 A1 | 11/2016 |

OTHER PUBLICATIONS

Anonymous, "Free-space path loss", Wikipedia.org, May 31, 2022, 5 pp., Retrieved from the Internet: URL: https://en.wikipedia.org/w/index.php?title=Free-space_path_loss&oldid=983834213.

(Continued)

*Primary Examiner* — Adolf Dsouza
(74) *Attorney, Agent, or Firm* — Shumaker & Sieffert, P.A.

(57) ABSTRACT

Methods of deriving location information of a wireless device include deriving, in the continuous domain, a location of a wireless device and at least one time and location varying path loss function parameter. The coordinates and parameter are derived based on signal strength measurements made at the wireless device, with the measured signals originating from a plurality of wireless transmitters, such as access points. The derived path loss function parameter can include one or more of a path loss exponent parameter, an intercept parameter, a receiver antenna gain parameter, transmitter antenna gain parameter, or a transmit power parameter.

20 Claims, 19 Drawing Sheets

Related U.S. Application Data

(60) Provisional application No. 63/125,595, filed on Dec. 15, 2020.

(56) References Cited

U.S. PATENT DOCUMENTS

| | | |
|---|---|---|
| 9,762,485 B2 | 9/2017 | Kaplan et al. |
| 9,832,082 B2 | 11/2017 | Dade et al. |
| 9,871,748 B2 | 1/2018 | Gosselin et al. |
| 9,985,883 B2 | 5/2018 | MeLampy et al. |
| 10,200,264 B2 | 2/2019 | Menon et al. |
| 10,277,506 B2 | 4/2019 | Timmons et al. |
| 10,432,522 B2 | 10/2019 | Kaplan et al. |
| 10,756,983 B2 | 8/2020 | Ratkovic et al. |
| 10,862,742 B2 | 12/2020 | Singh |
| 10,904,851 B1 * | 1/2021 | Henry .................. H04W 24/02 |
| 10,958,537 B2 | 3/2021 | Safavi |
| 10,958,585 B2 | 3/2021 | Safavi |
| 10,985,969 B2 | 4/2021 | Safavi |
| 10,992,543 B1 | 4/2021 | Rachamadugu et al. |
| 11,743,151 B2 | 8/2023 | Safavi |
| 2013/0300607 A1 | 11/2013 | Mansour |
| 2016/0337161 A1 | 11/2016 | Huibers |
| 2020/0403890 A1 | 12/2020 | McCulley et al. |
| 2021/0256833 A1 * | 8/2021 | Daoura ................. H04W 4/021 |
| 2021/0306201 A1 | 9/2021 | Wang et al. |
| 2022/0191647 A1 | 6/2022 | Zohoorian et al. |

OTHER PUBLICATIONS

Extended Search Report from counterpart European Application No. 21214060.2 dated Jun. 15, 2022, 9 pp.

Prosecution History from U.S. Appl. No. 17/453,752, dated Jul. 3, 2023 through Jan. 24, 2024, 63 pp.

Response to Extended Search Report dated Jun. 15, 2022, from counterpart European Application No. 21214060.2 filed Jan. 6, 2023, 19 pp.

\* cited by examiner

1000

| | | # OF RSSI VALUES | | | | | |
|---|---|---|---|---|---|---|---|
| | | 2 | 3 | 4 | 5 | 6 | 7 |
| | PARAMETER | | | | | | |
| 1002 | X COORDINATE | PREV +S | H | H | H | H | H |
| 1004 | Y COORDINATE | PREV +S | H | H | H | H | H |
| 1006 | Z COORDINATE | CONST. | CONST. | CONST. | CONST. | H | H |
| 1008 | INTERCEPT | CONST. | CONST. | CONST. | H | H | H |
| 1010 | PLE | CONST. | CONST. | H | H | H | H |
| 1012 | SIGMA | CONST. | CONST. | CONST. | CONST. | CONST. | H |
| 1014 | MEAN | CONST. | CONST. | CONST. | CONST. | CONST. | CONST. |

FIG. 10

DETERMINING LOCATION BASED ON DYNAMIC PATH LOSS EXPONENT (PLE) AND INTERCEPT (INT) ESTIMATION

This application is a continuation of U.S. patent application Ser. No. 17/453,752, filed 5 Nov. 2021, which claims the benefit of U.S. Provisional Patent Application No. 63/125,595, filed 15 Dec. 2020, the entire content of each application is incorporated herein by reference.

TECHNICAL FIELD

This disclosure relates generally to location function determination based on received radio signals.

BACKGROUND

Knowing a location of a wireless terminal is useful in a variety of applications. Wireless terminal location is obtained, in some examples, via a satellite positioning receiver, such as a global positioning system (GPS) receiver integrated into the wireless terminal. However, indoor environments are not generally amenable to location determination via GPS. Therefore, a variety of other techniques are used to locate a wireless device when the wireless device is located indoors. Many of these techniques rely on signal strength measurements, either made by the wireless device itself, or by other devices that receive signals generated by the wireless device.

SUMMARY

In accordance with one or more techniques of the disclosure, in order to provide more accurate location determinations, one or more processors, such as one or more processors of a location determination server (LDS), considers the location and time dependency of path loss function (PLF) parameters when determining a wireless device location. For example, the one or more processors may derive values of a plurality of unknown state variables, in the continuous domain, via a plurality of equations that each represent a signal strength measurement from a corresponding plurality of signal strength measurements. By solving multiple equations having multiple unknowns, the one or more processors derive values for time and location varying path loss function parameters. These dynamically varying parameters include, in various examples, one or more of a path loss exponent (PLE) parameter which depends on the location of the wireless device, an intercept (Int) parameter which may include a receiver antenna gain (Gr) parameter and a transmit antenna gain (Gt) parameter, and one or more other parameters which depend on the frequency of the transmitting signal and the location of the wireless device.

A method, comprising obtaining, by one or more processors of a location determination server, a signal strength measurement for each of a plurality of wireless signals received by a wireless device from a corresponding plurality of wireless transmitters; generating, by the one or more processors, for each of the signal strength measurements, a probability distribution function indicative of a probability that the wireless device is in a location, the probability distribution function including an unknown path loss function parameter that varies based on the location of the wireless device; deriving, by the one or more processors and based on the probability distribution functions generated for each of the signal strength measurements, the location of the wireless device; and generating an output indicating the location of the wireless device.

In another example, the disclosure is directed to a system comprising one or more processors; one or more memories storing a signal strength measurement for each of a plurality of wireless signals received by a wireless device from a corresponding plurality of wireless transmitters and a known location for each of the plurality of wireless transmitters; the one or more memories further storing instructions that when executed configure the one or more processors to: generate, for each of the signal strength measurements, a probability distribution function indicative of a probability that the wireless device is in a location, the probability distribution function including an unknown path loss function parameter that varies based on the location of the wireless device; derive, based on the probability distribution functions generated for each of the signal strength measurements, and further based on known locations of the plurality of wireless transmitters, the location of the wireless device; and generate an output indicating the location of the wireless device.

In another example, the disclosure is directed to a non-transitory computer-readable storage medium comprising instructions that, when executed, configure processing circuitry to: obtain a signal strength measurement for each of a plurality of wireless signals received by a wireless device from a corresponding plurality of wireless transmitters; generate, for each of the signal strength measurements, a probability distribution function indicative of a probability that the wireless device is in a location, the probability distribution function including an unknown path loss function parameter that varies based on the location of the wireless device; deriving, based on the probability distribution functions generated for each of the signal strength measurements, and further based on known locations of the plurality of wireless transmitters, the location of the wireless device; and generate an output indicating the location of the wireless device.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

The examples herein may be better understood by referring to the following description in conjunction with the accompanying drawings in which like reference numerals indicate identically or functionally similar elements, of which:

FIG. 10 is an example data table used to determine a priority of unknown states in in accordance with one or more techniques of the disclosure.

DETAILED DESCRIPTION

Figure 1A:
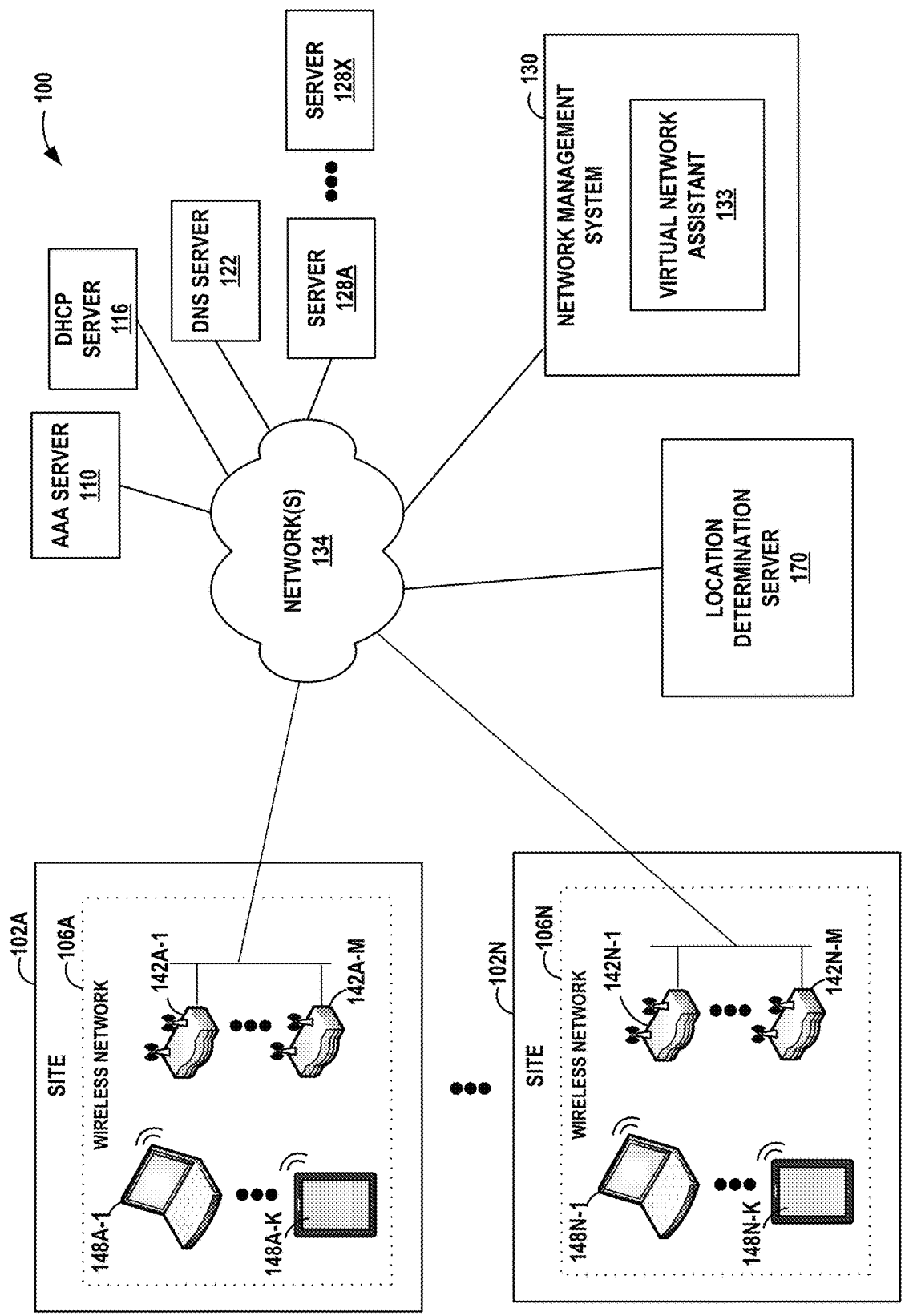
FIG. 1A is a diagram of an example network system in which the locations of one or more wireless devices are determined in accordance with one or more techniques of the disclosure.

Existing solutions of locating a wireless device typically utilize constants or static values for path loss parameters. However, path loss function (PLF) parameters vary based on time and location of the wireless device. For example, a device moving through a building will change its position relative to walls and other objects between the wireless device and a wireless transmitter. When a wireless device is in a first position, for example, a signal from the wireless transmitter may need to pass through and/or be reflected by a series of objects to reach the wireless device. In a second position, the signal may need to pass through and/or be reflected by a different series of objects to reach the wireless device. These differences in a signal path taken by a signal generated by the wireless transmitter and received by the wireless device result in different path losses between the two devices depending upon the location of the wireless device. These simplifying assumptions utilized in existing location solutions (e.g., that PLF parameters are constant across an area of interest, and that the PLF parameters remain constant over time) thus result in a reduced accuracy of the location estimate. Both of these assumptions are generally incorrect in real world environments, and thus result in a degradation of estimates that rely on these assumptions.

PLF parameters vary by location due to a number of factors. For example, particularly in an indoor environment, a number and/or type of wall between a transmitter and receiver can have a relatively large effect on PLF parameters. As a device moves to various locations within a building, a configuration of walls between the transmitter and receiver will also vary, and can thus have a relatively large effect on how a signal travels between the two devices. For example, a signal received by the receiving device is a product both of a signal received directly from the transmitting device, but also resulting from signal reflections from objects within the environment. The nature and strength of these signal reflections varies significantly depending on the building configuration and relative positions of the transmitter and receiver. Differences in PLF parameters can also result from physical changes to a building layout. For example, many modern office buildings are equipped with modular furniture that is designed to provide for frequent reconfiguration to adjust to various staffing requirements that may arise. Changes to these configurations can result in relatively large degrees of variance in PLF parameters for a transmitter/receiver pair, even when the receiver remains in a stable location.

In accordance with one or more techniques of the disclosure, in order to provide more accurate location determinations, one or more processors, such as one or more processors of a location determination server (LDS), considers the location and time dependency of PLF parameters when determining a wireless device location. For example, the one or more processors may derive values of a plurality of unknown state variables, in the continuous domain, via a plurality of equations that each represent a signal strength measurement from a corresponding plurality of signal strength measurements. By solving multiple equations having multiple unknowns, the one or more processors derive values for time and location varying path loss function parameters. These parameters include, in various examples, one or more of a path loss exponent (PLE) parameter, an intercept (Int) parameter, a receiver antenna gain (Gr) parameter, a transmit antenna gain (Gt) parameter, or a transmit power (Pt) parameter.

In some examples, the processor(s) computes first derivatives of the generated equations, and evaluates the derivatives across a number of possible values for the unknown parameters or states. In some examples, the processor(s) implements a gradient ascent or gradient descent method to identify parameter values that maximize a probability that a wireless device is located in a particular location.

In some examples, the processor(s) derives, along with a location of a wireless device, an intercept parameter and/or a path loss exponent parameter. The intercept parameter includes one or more components/parameters, such as a transmit power component, a receiver antenna gain parameter, or a transmit antenna gain parameter. In some examples, both the receiver antenna gain parameter and the transmit antenna gain parameter are functions of the wireless device position or location. In some examples, a transmit power component is known or otherwise estimable, for example, via heuristics or via a communication exchange with one or more access points. In some examples, the processor(s) thus derives only components of the intercept parameter and not the intercept parameter as a whole. By reducing the scope of the unknown states being derived by the disclosed examples, an error is reduced.

In accordance with one or more techniques of the disclosure, each pairing of two communicating wireless devices has its own unique signal path characteristics. These unique signal paths are modeled via intercept parameters specific to each device pair. Thus, for example, when describing signal paths between a first wireless device and each of two other devices, two separate intercept parameters, one for each signal path, would provide some consistency with modeling separate independent physical properties of each signal path. The techniques of the disclosure depart from this approach to modeling the communication environment by deriving a single intercept parameter that is used to model both of these two separate signal paths in this example. More generally, in some examples, the processor(s) derives a single intercept parameter value across a plurality of signal paths between a wireless device, having an unknown position, and a corresponding plurality of network devices, such as access points.

In some examples, this use of a single intercept parameter is modified to instead derive one or more components of the single intercept parameter instead of the intercept parameter as a whole. In such examples, the processor(s) derives one or more of a transmit power parameter, a receiver antenna gain parameter, or a transmit antenna gain parameter. Note again that a proper modeling of separate signal paths between separate pairs of devices would typically include separate transmit power, receiver antenna gain, and transmit antenna gain parameters for each signal path. In contrast, the techniques of the disclosure derive one or more of these parameters that are each a single approximation for multiple signal paths between a wireless device and a plurality of network devices, such as access points. A surprising result of this approach is that significant improvements in an accuracy of a location estimate of the wireless device is achieved when relying on this single approximation of the intercept parameter or one or more of its components, and using that derived component, in concert with signal strength measurements from multiple signal paths, to estimate the location of the wireless device. Some of these surprising results are illustrated in FIGS. 12A-B and 13A-B below.

FIG. 1A is a diagram of an example network system 100 in which a location determination server (LDS) 170 determines location(s) of one or more wireless devices in accordance with one or more techniques of the disclosure. The wireless devices may be referred to herein alternately as wireless clients and/or user equipment (UE) devices. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as enterprises, offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-N. Similarly, site 102N includes a plurality of AP devices 142N-1 through 142N-N. Each AP device 142 may be any type of wireless access point, including, but not limited to, a commercial or enterprise access point, a router, or any other device capable of providing wireless network access.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. At least some of the UEs 148 are wireless devices which move throughout system 100. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), a network management system (NMS) 130 and LDS 170. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, LDS 170 and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may include a plurality of states or parameters indicative of one or more aspects of wireless network performance. The data may be ingested form numerous sources, including client devices, APs, switches, firewalls etc. The network data may be stored in a database, such as network data 137 within NMS 130 or, alternatively, in an external database. In general, NMS 130 may provide a cloud-based platform for network data acquisition, monitoring, activity logging, reporting, predictive analytics, network anomaly identification, and alert generation. In some examples, NMS 130 uses a combination of artificial intelligence, machine learning, and data science techniques to optimize user experiences and simplify operations across any one or more of wireless access, wired access, and SD-WAN domains.

NMS 130 observes, collects and/or receives network data for a variety of client devices, such as SDK clients, named assets, and/or client devices connected/unconnected to the wireless network. The network data is indicative of one or more aspects of wireless network performance. The network data may take the form of data extracted from messages, counters and statistics, for example. The network data may be collected and/or measured by one or more UEs 148 and/or one or more AP devices 142 in a wireless network 106. Some of the network data may be collected and/or measured by other devices in the network system 100, such as switches or firewalls. In accordance with one specific implementation, network management server 130 includes at least one computing device or processor. In accordance with other implementations, NMS 130 may comprise one or more computing devices, processors, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. For example, VNA 133 of NMS 130 may include a network performance engine that automatically determines one or more service level exception (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client device's received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to identify the root cause of error conditions or poor wireless network performance metrics detected or predicted from the streams of event data. VNA 133 may generate a notification indicative of the root cause and/or one or more remedial actions that may be taken to address the root cause of the error conditions or poor wireless network performance metrics. In some examples, if the root cause may be automatically resolved, VNA 133 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

In accordance with one or more techniques of the disclosure, LDS 170 determines the location(s) of one or more wireless devices including any one or more of UEs 148. NMS 130 receives location information regarding UEs 148 from LDS 170. NMS 130 may invoke one or more actions based on the location information received with respect to one or more of UEs 148 in any one or more of wireless networks 106. For example, NMS may provide location services to one or more of UEs 148. The location services may include, for example, any one or more of wayfinding, location-based proximity notifications, asset tracking, etc. NMS 130 may also provide location-based analytics to a network administrator or other user that derive insights from client mobility through the premises.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

Figure 1B:
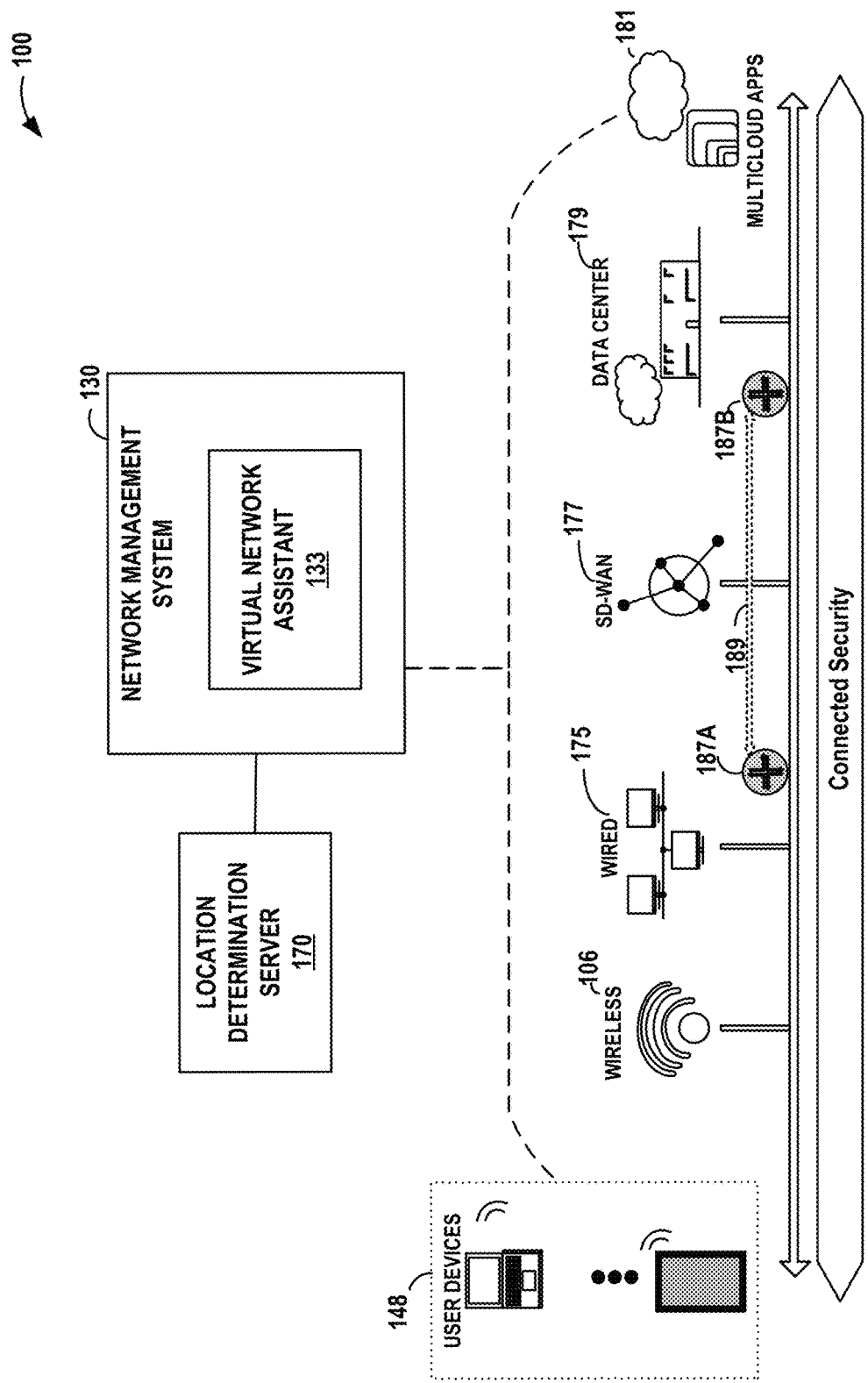
FIG. 1B is a block diagram illustrating further details of the example network system of FIG. 1A.

FIG. 1B is a block diagram illustrating further example details of the network system 100 of FIG. 1A. In this example, FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B). In accordance with one or more techniques of the disclosure, NMS 130 receives location information regarding one or more UEs 148 from LDS 170. NMS 130 may use the location information received with respect to any one or more of UEs 148 to provide, for example, AI-driven location services to UEs 148 in any one or more of wireless networks 106 and/or location-based analytics regarding any one or more of wireless networks 106.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Figure 2:
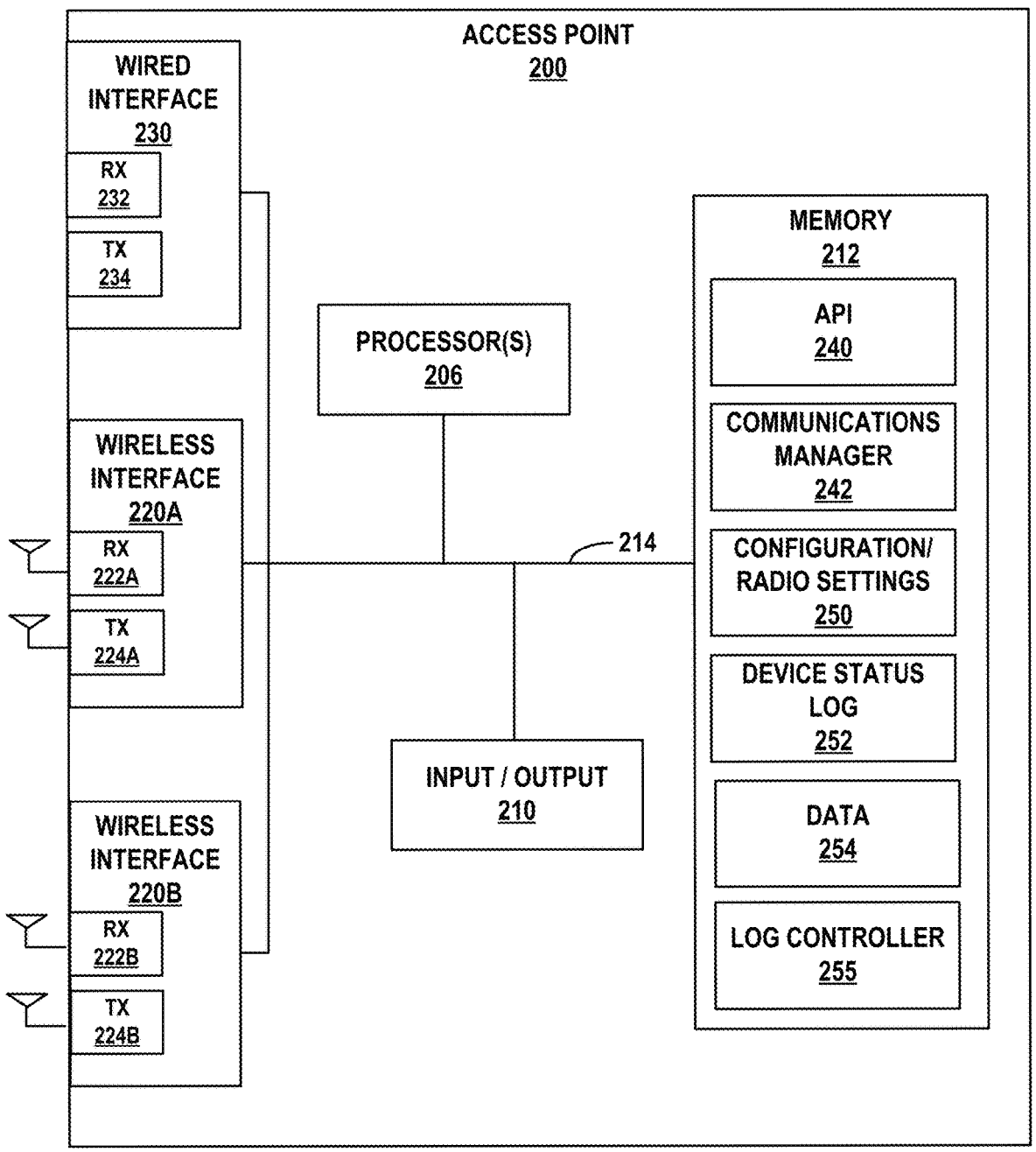
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG.

1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data storage 254 may include, for example, AP events and/or UE events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, one or more types of proximity events, etc., as well as a time and date stamp for each event. Log controller 255 determines a logging level for the device based on instructions from NMS 130. Data 254 may store any data used and/or generated by access point device 200, including data collected from UEs 148.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3A:
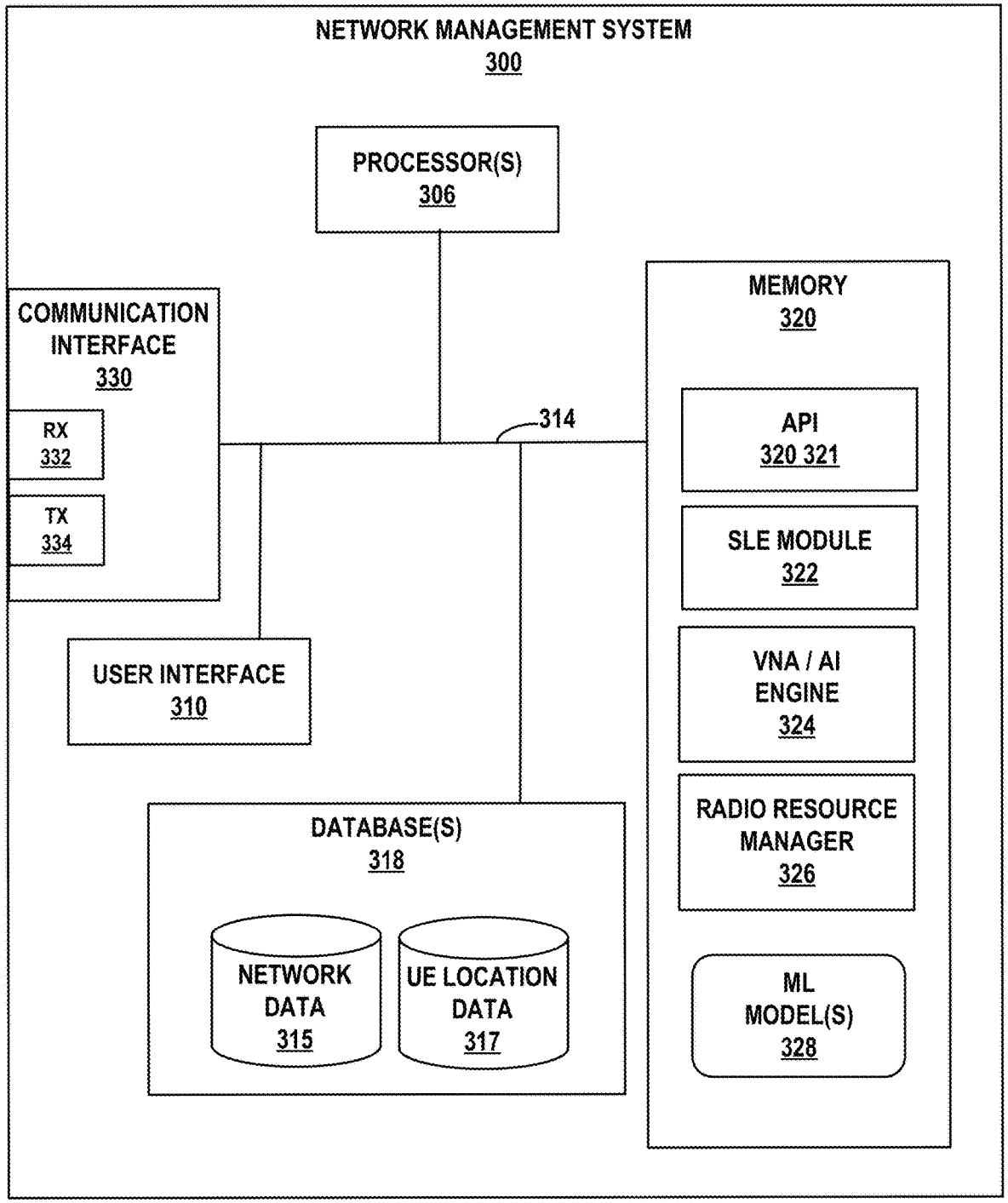
FIG. 3A is a block diagram of an example network management system in accordance with one or more techniques of the disclosure.

FIG. 3A is a block diagram of an example network management system (NMS) 300 that receives location information for one or more UEs 148 in a wireless network 106 from LDS 170 (also shown in FIG. 3B as location server 350), in accordance with one or more techniques of the disclosure. NMS 300 may be used to implement, for example, NMS 130 in FIG. 1A. In such examples, NMS 300 is responsible for monitoring and management of one or more wireless networks 106A-106N at sites 102A-102N, respectively. In some examples, NMS 300 receives network data collected by AP devices 142 from UEs 148, such as network data including proximity information used to determine one or more proximity assessments, and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128 and/or any other devices or systems forming part of network 100 such as shown in FIG. 1A. The data and information received by NMS 300 may include, for example, network data and/or event log data received from access points 142 used by NMS 300 to remotely monitor and/or control the performance of wireless networks 106A-106N. NMS may further transmit data via communications interface 330 to any of network devices such as APs 142 at any of network sites 102A-102N to remotely manage wireless networks 106A-106N.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 321, SLE module 322, a radio resource management (RRM) engine 326, a virtual network assistant (VNA)/AI engine 324, and one or more machine learning models 328. NMS 300 may also include any other programmed modules, software engines and/or interfaces configured for remote monitoring and management of wireless networks 106A-106N, including remote monitoring and management of any of AP devices 142.

RRM engine 326 monitors one or more metrics for each site 106A-106N in order to learn and optimize the radio-frequency (RF) environment at each site. For example, RRM engine 326 may monitor the coverage and capacity SLE metrics (e.g., managed by SLE module 322) for a wireless network 106 at a site 102 in order to identify potential issues with coverage and/or capacity in the wireless network 106 and to make adjustments to the radio settings of the access points at each site to address the identified issues. RRM engine 326 may determine channel and transmit power distribution across all AP devices 142 in each network 106A-106N. RRM engine 326 may monitor events, power, channel, bandwidth, and number of clients connected to each AP device. RRM engine 326 may measure the strength of a radio signal of client devices, such as an RSSI value. RRM engine 326 may further automatically change or update configurations of one or more AP devices 142 at a site 106 with an aim to improve the coverage and/or capacity SLE metrics and thus to provide an improved wireless experience for the user. In some examples, RRM engine 326 may use received signal strength indicator (RSSI) information received from one or more UEs 148 in order to learn and optimize the RF environment provided by one or more APs 142 in the wireless network.

VNA/AI engine 324 analyzes network data received from AP devices 142 as well as its own data to monitor performance of wireless networks 106A-106N. For example, VNA engine 324 may identify when anomalous or abnormal states are encountered in one of wireless networks 106A-106N. VNA/AI engine 324 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 324 may automatically invoke one or more remedial actions intended to address the identified root cause(s) of one or more poor SLE metrics. Examples of remedial actions that may be automatically invoked by VNA/AI engine 350 may include, but are not limited to, invoking RRM 326 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 324 may proactively and automatically provide a notification including recommended remedial actions to be taken by IT personnel to address the anomalous or abnormal wireless network operation.

SLE module 322 enables set up and tracking of thresholds for one or more SLE metrics for each of wireless networks 106A-106N. SLE module 322 further analyzes network data (e.g., stored as network data 316) collected by AP devices and/or UEs associated with wireless networks 106A-106N, such as any of AP devices 142 from UEs 148 in each wireless network 106A-106N. For example, AP devices 142A-1 through 142A-N collect network data from UEs 148A-1 through 148A-N currently associated with wireless network 106A (e.g., named assets, connected/unconnected Wi-Fi clients). This data, in addition to any network data collected by one or more APs 142A-1 through 142A-N in wireless network 106A, is transmitted to NMS 300 and stored as, for example, network data 315.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

Figure 3B:
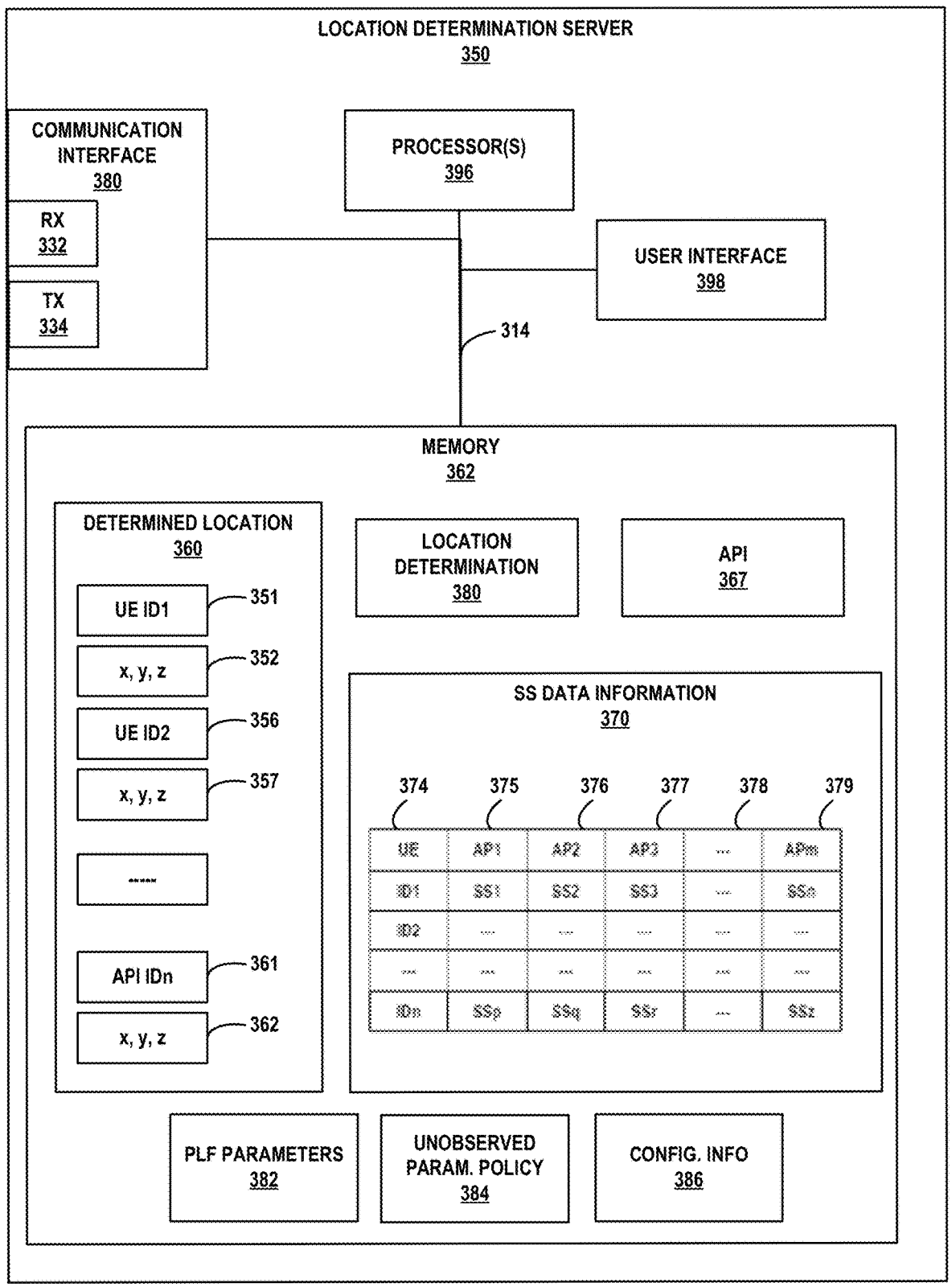
FIG. 3B is a block diagram of an example location determination server (LDS) in accordance with one or more techniques of the disclosure.

FIG. 3B is a block diagram of an example location determination server (LDS) 350 in accordance with one or more techniques of the disclosure. LDS 350 may be used to implement the LDS 170 of FIGS. 1A and 1B in accordance with one or more techniques of the disclosure. In general, example LDS 350 includes a module that receives messages from a wireless device in the network. The one or more messages indicate signal strengths associated with signals received by the wireless device and originating from the various APs. The LDS 350 then uses these signals to determine the location of the various wireless devices.

LDS 350 includes a communications interface 380, e.g., an Ethernet interface, a hardware processor 396, a user interface 398 (e.g., display, printer, keyboard, keypad, touch screen, mouse, stylus, etc.), and a memory 362 coupled together via a bus 314 over which the various elements interchange data and information. Communications interface 380 couples the LDS 350 to a network and/or the Internet. Communications interface 330 includes a receiver 332 via which the LDS 350 receives data and information, e.g., including signal strength information from the various wireless devices (e.g., UEs), and a transmitter 334, via which the LDS 350 transmits data and information, e.g., including location information for one or more wireless devices, and confirm receipt of information from other devices of the network.

Memory 362 includes signal strength information table 370, locations of wireless devices 350, and path loss function (PLF) parameters 382. Location determination module 380 includes for example, one or more software modules that, when executed by the one or more processors(s) 396, cause processors 396 to determine locations of one or more wireless devices. Memory 362 further includes an Application Programming Interface (API) 367. Memory 362 further includes a signal strength information table 370 that includes a list of wireless device IDs in column 374. Columns 375 through 379 provide a structure to store the signal strength measured by each wireless device, e.g., devices with device IDs $ID_1$ through $ID_n$, originating from APs $AP_1$ through $AP_m$. For example, the table indicates that a wireless device with a wireless device ID $ID_1$ receives a signal from $AP_1$ with a signal strength value of $SS_1$. The wireless device receives, from $AP_2$, a signal strength measurement value of $SS_2$. Configuration information 386 stores configuration parameters entered by the system administrator or by the programmer.

Memory 362 further includes a determined location data structure 360 configured to store determined locations of one or more wireless devices (e.g., as (x, y) or (x, y, z) coordinates), determined by location determination module 380. For example, FIG. 3B shows an example of a first user equipment (UE) or first wireless device identifier ID1 351 and a corresponding location (e.g., (x, y) or (x, y, z) coordinates) of the first wireless device 352. FIG. 3B also shows a second UE or second wireless device identifier ID2 356 and a corresponding location (e.g., (x, y) or (x, y, z) coordinates) of the second wireless device 357. FIG. 3B further shows an access point identifier stored at memory location 361 and a corresponding location (e.g., (x, y) or (x, y, z) coordinates) of the access point stored at location 362. Data structure 360 also stores locations of one or more AP devices are stored in data structure 360. Although the AP locations are shown as being stored in the same data structure 360 as the one or more determined UE locations, the AP locations may be stored in a different data structure, and the disclosure is not limited in this respect.

Path loss function (PLF) parameters 382 provide storage place for the specific location dependent dynamic parameters in accordance with one or more techniques of the disclosure described herein below. Unobserved states policy 384 determines the priority of including the various unobserved states (variables) in the process of determining the location of the wireless device. The utilization of this policy in accordance with one or more techniques of the disclosure is explained in greater detail with regards to operation (925) of FIG. 9, and the example data table 1000 of FIG. 10.

Figure 4:
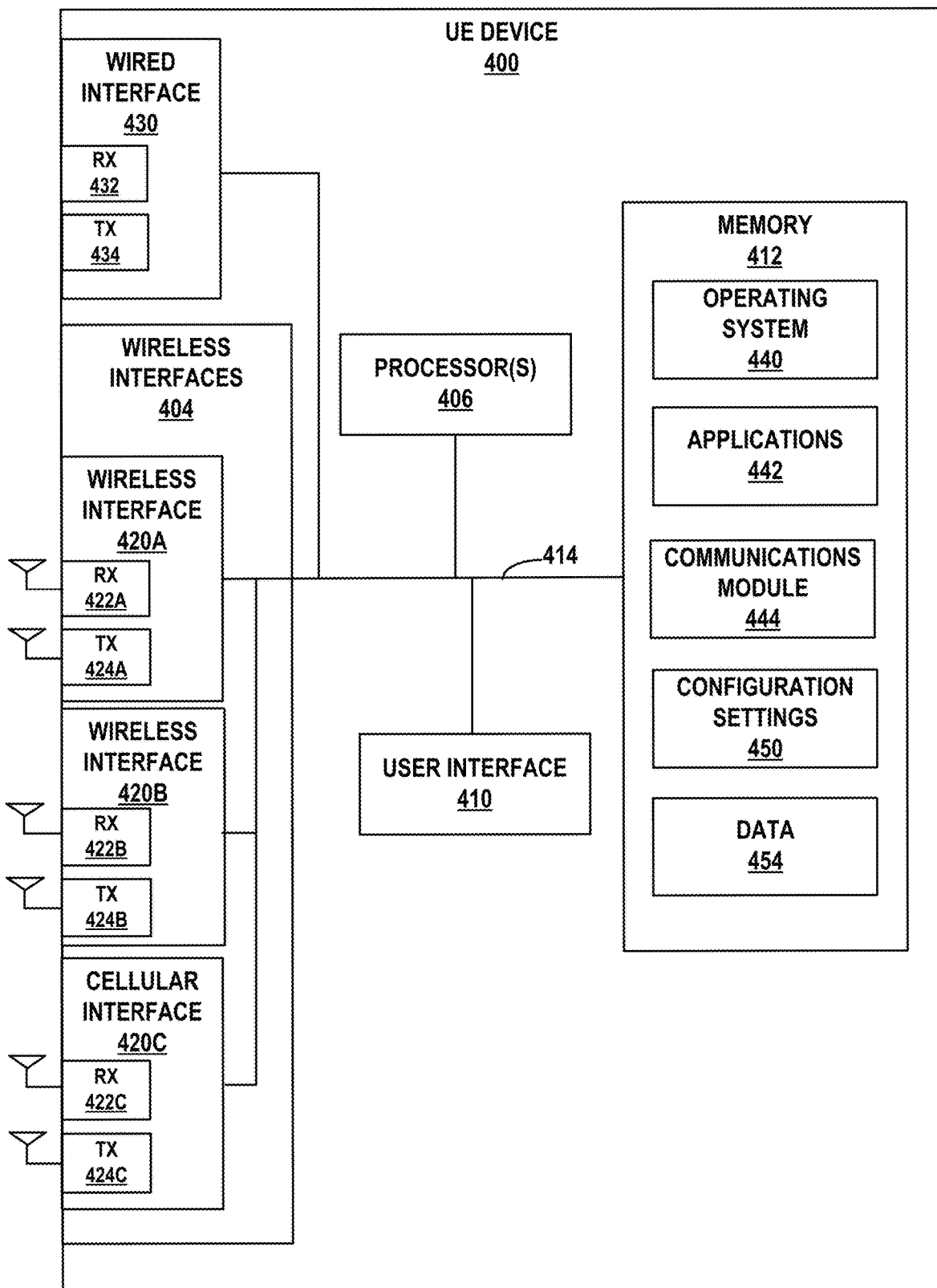
FIG. 4 is a block diagram of an example user equipment device in accordance with one or more techniques of the disclosure.

FIG. 4 is a block diagram of an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of the disclosure, NMS 130 receives relevant network data from UEs 148 on a continuous basis (e.g., every 2 seconds or other appropriate time period). The network data may be stored in, for example, network data 454, and may include, for example, RSSI measurements of one or more wireless signals received from one or more AP devices by UE 400.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1, AP device 200 of FIG. 2, other UEs 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the UE functions described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage for network data 454 may store any data used and/or generated by UE 400, such as network data used by LDS 170/350 to determine a location of UE 400, that is collected by UE 400 and transmitted to any of AP devices 138 in a wireless network 106 for further transmission to NMS 130.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

Figure 5:
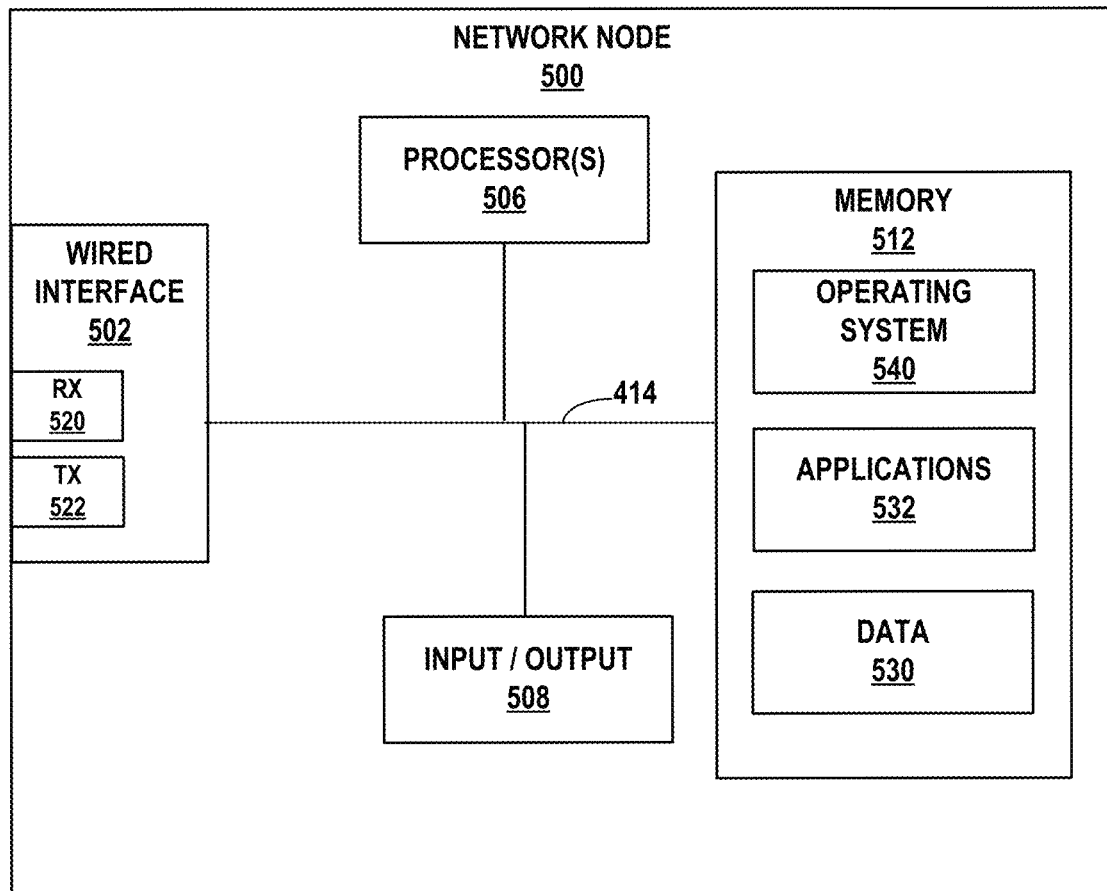
FIG. 5 is a block diagram of an example network node, such as a router or switch, in accordance with one or more techniques of the disclosure.

FIG. 5 is a block diagram illustrating an example network node 500. In one or more examples, the network node 500 implements a device or a server attached to the network 134 of FIG. 1, e.g., router, switch, AAA server 110, DHCP server 116, DNS server 122, VNA 133, Web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 stores executable software applications 532, operating system 540 and data/information 530. Data 530 includes system log and/or error log that stores network data and/or proximity information for node 500 and/or other devices, such as wireless access points, based on a logging level according to instructions from the network management system. Network node 500 may, in some examples, forward the network data to a network management system (e.g., NMS 130 of FIG. 1) for analysis as described herein.

Figure 6A:
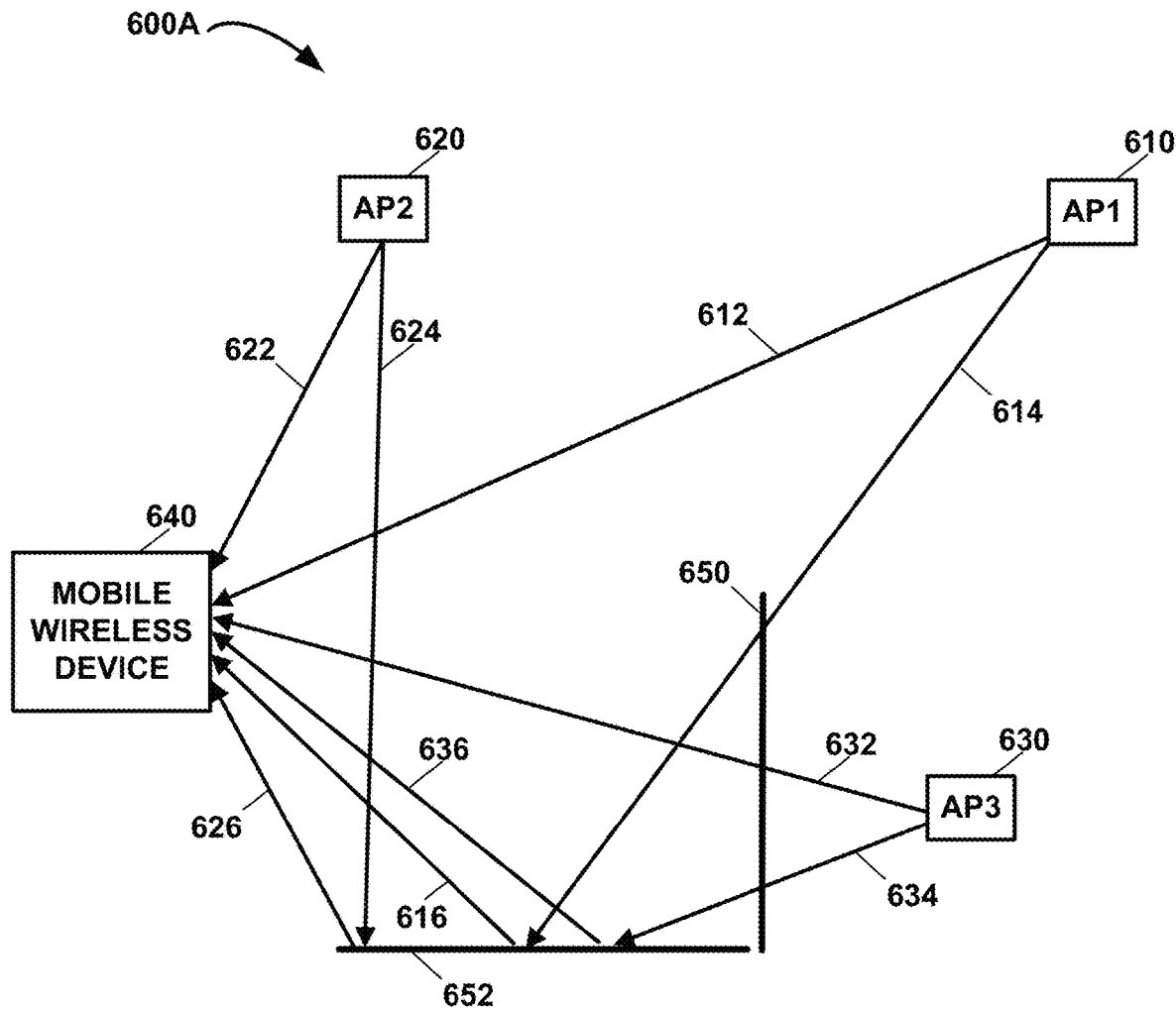
FIGS. 6A-C show example network environments that include a wireless device, APs, and one or more signal paths between the two devices.

FIG. 6A shows an example network environment 600A. FIG. 6A illustrates three access points within the network environment 600A, labeled as AP1 610, AP2 620, and AP3 630. The three APs provide network connectivity to a wireless device 640. The wireless device 640 is shown in a first position relative to two walls, labeled wall 650 and wall 652. FIG. 6A shows some signal paths between the APs and the wireless device 640 travel directly from an AP to the wireless device 640. For example, each of signal paths 612, 622, and 632 shows direct signal paths between the APs and the wireless device 640. Other signals pass through the wall 650, or are reflected by the wall 652, or both pass through the wall 650 and are reflected by the wall 652. As shown, a first signal path 612 travels from API directly to the wireless device 640. A signal path 614 travels through the wall 650 and then is reflected by the wall 652 as signal path 616. Similarly, a signal path 622 travels directly from AP2 to the wireless device 640. An additional signal path 624 travels from the AP2 620 and is reflected by the wall 652. The reflected signal travels along signal path 626. Signal path 632 travels from AP3 630 through the wall 650 to the wireless device 640. An additional signal path 634 travels from the AP3 630 and is reflected by the wall 652. The reflected signal travels along signal path 636.

As a result of the various signal paths illustrated in FIG. 6A, path loss parameters associated with signals transmitted from each one of the APs AP1, AP2, and AP3 and received by the wireless device 640 generally vary.

Figure 6B:
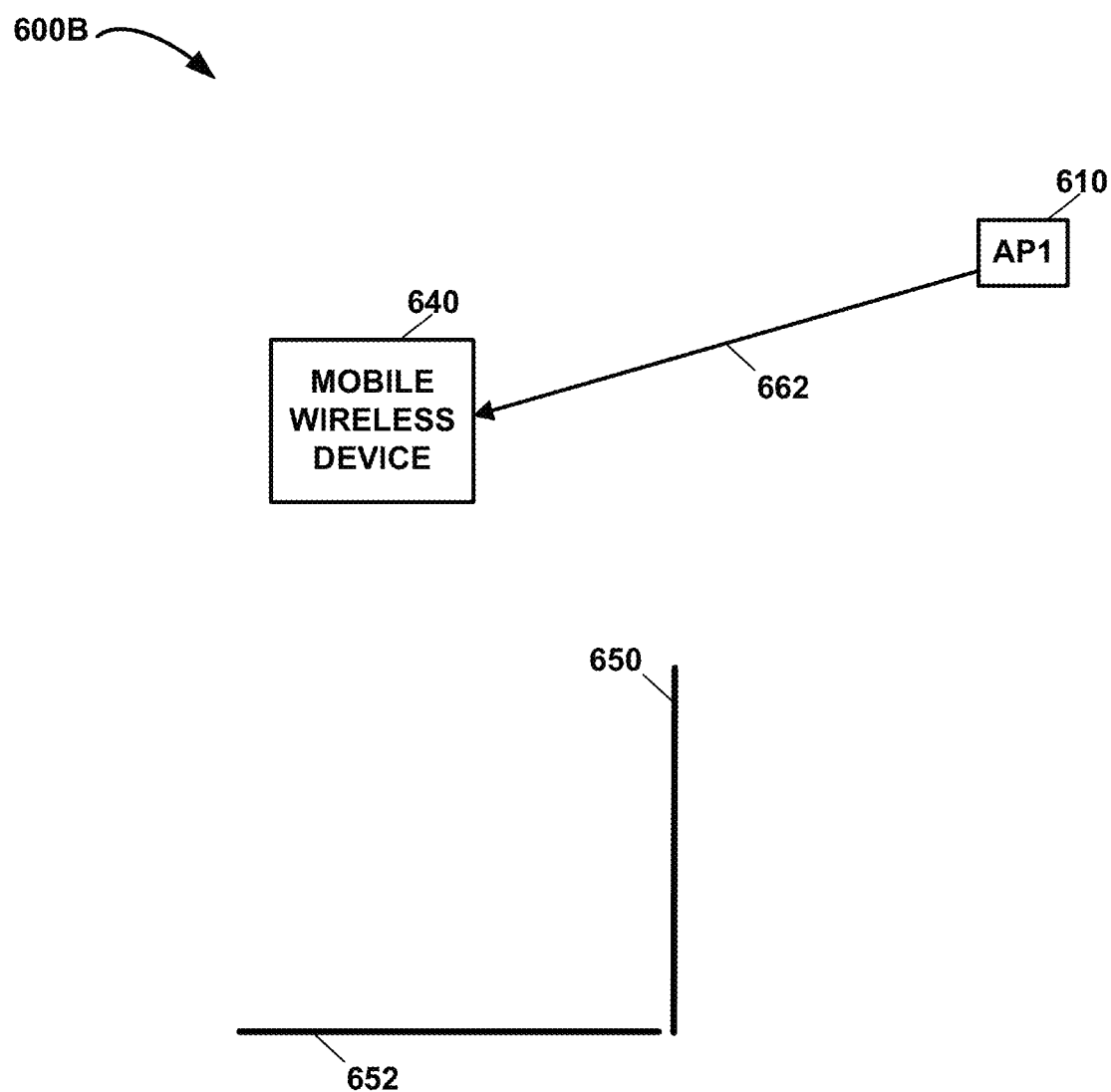

FIG. 6B illustrates an example network environment 600B after the wireless device 640 has moved from the first position of FIG. 6A to a second position. The movement of the wireless device 640 changes the wireless device 640's position relative to each of the wall 650 and the wall 652. This change in relative position changes the paths signals travel from each of the APs 610, 620, and 630 when they are received by the wireless device 640. To simplify FIG. 6B, only the signal path 662 between AP1 610 and the wireless device 640 is illustrated. FIG. 6B illustrates that in the second location of the wireless device, reception of a signal from AP1 610 is dominated by a direct path 662 between the AP1 610 and the wireless device 640. The wireless device does not generally receive any signals of consequence that follow a path that includes the wall 650 or the wall 652.

The above discussion illustrates that signal paths to a wireless device experiences a large degree of variation when the wireless device 640 moves from the first position of FIG. 6A to the second position of FIG. 6B. This relatively large change in signal paths can result in relatively large differences in path loss function parameters between the wireless device 640 and the APs of FIG. 6A and/or FIG. 6B.

Figure 6C:
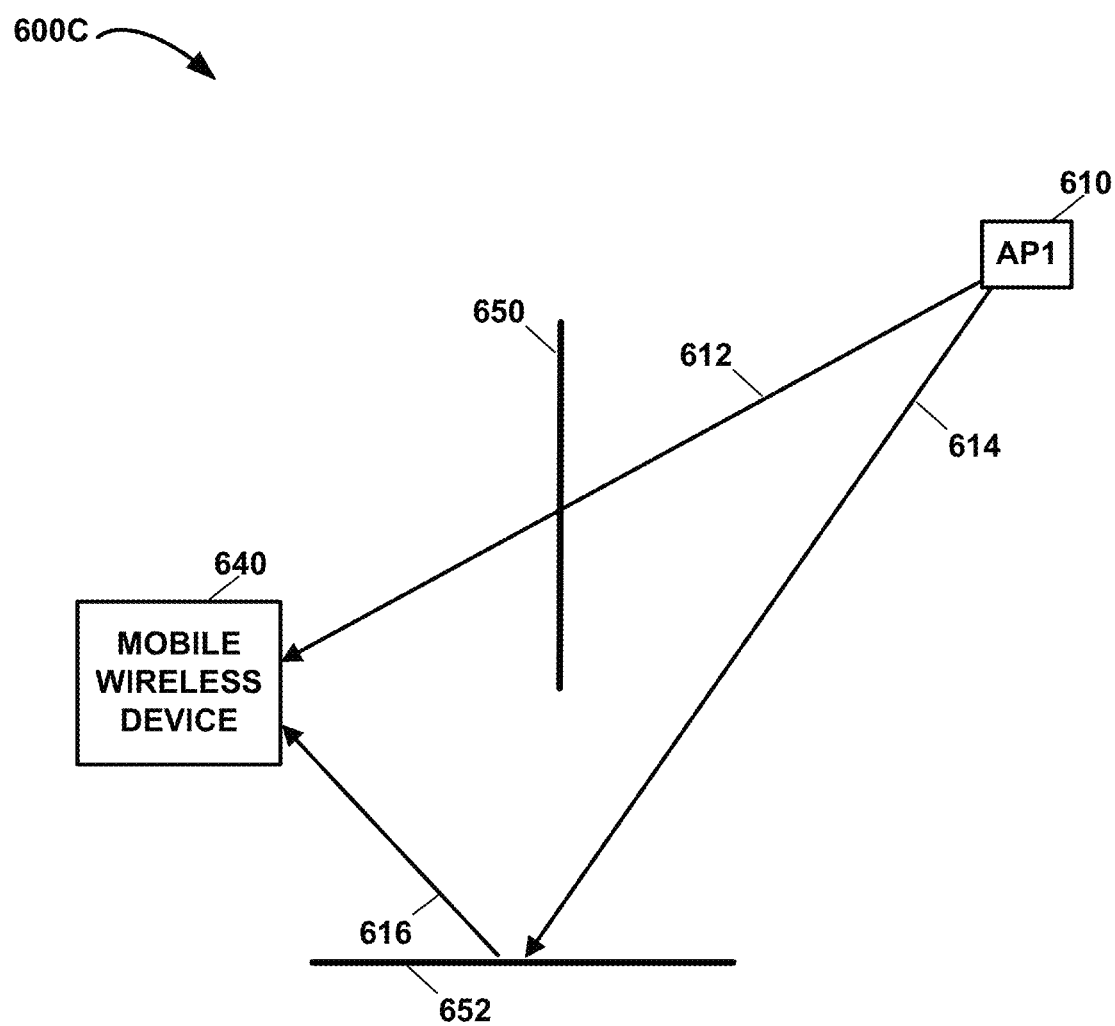

FIG. 6C illustrates a network environment 600C that results from a modification to the wall positions illustrated in FIGS. 6A and 6B. FIG. 6C shows that a position of the wall 650 has been moved relative to its position in each of FIGS. 6A and 6B. As illustrated, with the new location of the wall 650, signals traveling between the AP1 and the wireless device 640 follow a different path relative to the environments shown in FIGS. 6A and 6B. Thus, relative to the environments 600A and 600B of FIGS. 6A and 6B respectively, path loss function parameters experienced by the wireless device 640 will also vary.

An example path loss function (PLF) is given by $$SS = \text{Int} + PLE * \log(d) \qquad \text{Eq. 1}$$

where:
SS—a signal strength indicator (e.g., RSSI),
Int—an intercept. The intercept parameter depends on a transmission power and an antenna gain,
PLE—a path loss exponent parameter,
log—a logarithm function, and
d—a distance between the transmitter and the receiving device As discussed above, the intercept and path loss exponent parameters are dynamic in the sense that they are location and time dependent. In some environments, these parameters vary for each signal path, for example, between any one of the APs, e.g., AP1, AP2, AP3 and the device 640 of FIGS. 6A, 6B, and 6C. Existing location determination algorithms assume a predetermined value for each one of these parameters and use these values along with the signal strength values to estimate a distance d between each one of the APs and the wireless device. These distances are then used to determine the location of the wireless device.

One or more techniques of the disclosure recognize a location and time dependence of the Int and PLE parameters. In some examples, these values are estimated for each location at each time. The estimated location and time dependent PLF parameters (e.g., the Int and PLE parameters) are then used to estimate a distance between each one of the APs and the wireless device. Similarly, while existing location determination algorithms assume that the parameters of a probability distribution function associated with a received signal are constant, one or more techniques of the disclosure account for the time and location variability of parameters associated with the probability distribution function by characterizing these parameters as unknown states and then solving for them. Of further note is that while each path between a wireless transmitter and a wireless device has individual real-world physical values for PLE and Int parameters that vary across different pairs of devices, the disclosed examples approximate these PLF parameters by deriving a single set of common values of the PLF parameters that are applied across the pairs of devices. Thus, different PLF parameter values are not computed for each wireless device, AP pair.

As illustrated by FIGS. 6A, 6B, and 6C, signal strengths experienced by the wireless device depends on both a power of a transmitted signal, and one or more paths the signal travels before it is received by the wireless device. Thus, as shown by FIG. 6A, a signal travels a first signal path 612 and a second signal path 616. Signal path 616 is a result of a reflection of the signal off the wall 652 while traveling via signal path 614. Thus, one or more techniques of the disclosure consider not only direct signal paths between a transmitting device (e.g., AP 610) and a receiving device (e.g., wireless device 640), but also indirect signal paths such as those resulting from reflected signals. The resulting distortion is compensated for in some examples via determination of location and time dependent path loss function parameters.

Figure 7:
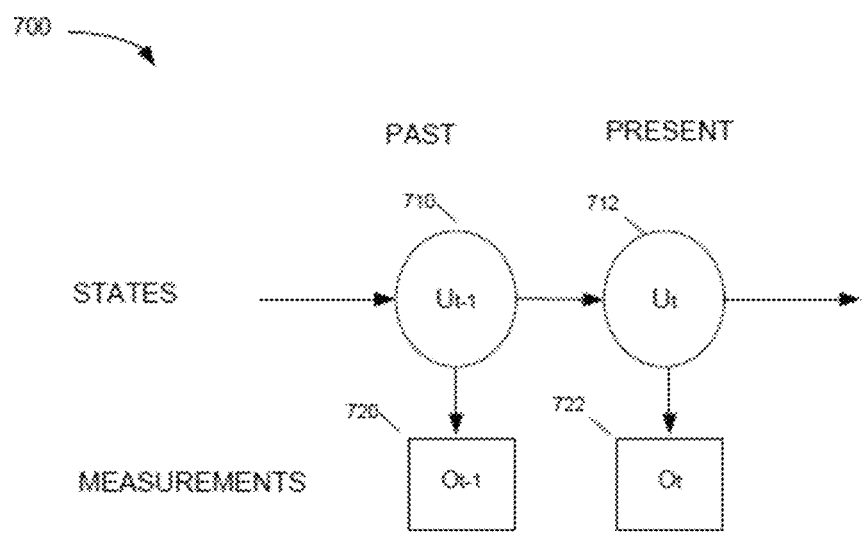
FIG. 7 illustrates an example Recursive Bayesian Estimation system.

FIG. 7 illustrates a Recursive Bayesian Estimation system 700 such as may be implemented by one or more processors, such as one or more processors of LDS 180, in accordance with one or more techniques of the disclosure. The states of the system 710 and 712 represent unobserved states of the system at times t−1 and t (shown as $U_{t-1}$ and $U_t$ respectively). Observed states at times t−1 and t are shown as observed state 720 (e.g., $O_{t-1}$), and observed state 722 (e.g., $O_t$) respectively.

In accordance with one or more techniques of the disclosure, the observed states are signal strength measurements of signals originating from a plurality of wireless transmitters, and received by a wireless device. Locations of the plurality of wireless transmitters within a coordinate space are known. In some examples, the wireless transmitters are each included in an access point (AP). Observed states are mathematically represented via Equation 2 below:

$$O_t = \{SS_1, SS_2, \ldots SS_{j-1}, SS_j, SS_{j+1}, \ldots S_n\} = \{SS_t\}_1^n \quad \text{Eq. 2}$$

where:
$O_t$—a measured (observed) state at time t,
$SS_j$—a signal strength of a signal originating at $AP_j$, as measured by a wireless device, the signal strength measurement associated with time t,
j—an index identifying a specific AP, with APs numbered from 1 to n, and
n—a number of APs from which the wireless device receives a signal.

Unobserved or inner states are represented by Equation 3 below:

$$U_t = (x, y, PLF)_t \quad \text{Eq. 3}$$

where:
$U_t$—an unobserved state at time t,
x—an unobserved x coordinate of the wireless device at time t,
y—an unobserved y coordinate of the wireless device at time t, and
PLF—Path Loss function (PLF) parameters at time t (e.g., Int and PLE parameters of Eq. 1).

In some examples, one or more processors, such as one or more processors of LDS 180, estimates the unknown states to provide an estimate of location and time dependent values for the PLF parameters along with the location, (e.g., in x, y, or x, y and z coordinates) of the wireless device.

While some disclosure below describes determining a location in 2 dimensions of a physical space at a particular time, those skilled in the art recognize that the techniques of the disclosure also apply to determining a location in three dimensions of a physical space at a particular time.

In some examples, a one or processors, such as one or more processors of LDS 180, represents the problem as a Bayesian equation, which facilitates determination of values for the unobserved states. The determination is based on values of the observed states discussed above:

$$P(U_t \mid O_t) = \frac{P(O_t \mid U_t) \cdot P(U_t)}{P(O_t)} \quad \text{Eq. 4}$$

where:
$P(U_t|O_t)$—a posterior probability, or a probability that the unobserved states assume a specific value given the observed signal strength measurements,
$P(O_t|U_t)$—a probability that the measured states have a specific value given that the unobserved states have a specific value. This probability is often referred to as likelihood,
$P(O_t)$—a probability that the measured states have a specific value. This probability generally has a specific constant value, and
$P(U_t)$—a prior probability that the unobserved states have specific values. This probability is referred to as prior.

In some examples, to determine the location of the wireless device (e.g., in x, y, and z coordinates) at a specific time, one or more processors, such as one or more processors of LDS 170/350, determines values of the parameters that maximize a probability of:

$$P(U_t \mid O_t) \quad \text{Eq. 5}$$

Or represented in another manner:

$$q_{u_t} = \text{Argmax}\{P(u_t \mid o_t) \cdot P(o_t)\} = \text{Argmax}\{P(o_t \mid u_t) \cdot P(u_t)\} \quad \text{Eq. 6}$$

where:
$q_{u_t}$—arguments that maximize the probability $P(u_t|o_t)$
As explained with reference to Equation 4 above, a probability $P(O_t)$ assumes a specific constant value and therefore does not affect a determination of the values of the arguments that maximize the probability of Equation 6. Similarly, since $P(u_t)$ is a constant value (a non-informative prior which is equal to one), it also does not affect the above mentioned determination of arguments that maximize the probabilities of equation 6. Thus, Equation 6 can be simplified into Equation 7 below:

$$q_{u_t} = \text{Argmax}\{P(u_t \mid o_t)\} = \text{Argmax}\{P(o_t \mid u_t)\} \quad \text{Eq. 7}$$

As indicated above with reference to Equations 2 and 3, the observed states are the signal strength measurements of signals originating at each one of the n APs. The unobserved parameters/variables, in a two dimensional location estimation, are given by (x, y, PLF)$_t$, or when evaluating the position of the wireless device in three dimensions, are given by (x, y, z, PLF)$_t$.

Since the signal strengths are mostly independent from each other, a probability P(u$_t$|o$_t$) of the unobserved states having particular values given the observed states can be represented as the multiplication of the individual probabilities of each one of the signal strength values. Such a representation is shown below with respect to Equation 8a:

$$P(o_t \mid u_t) = \prod_{i=1}^{n} Pdf(ss_i \mid (x, y, PLF)_t) \qquad \text{Eq. 8a}$$

where:
Pdf—is a probability distribution function,
ss—a signal strength measurement (e.g., RSSI),
i—an index representing a particular wireless transmitter,
x, y—a location of the wireless device in a coordinate system, and
PLF—an unknown set of path loss function parameters.

In some examples, the probability distribution function, Pdf, of Equation 8a is a Gaussian probability distribution function. In some other examples, Pdf is a Nakagami probability distribution function. In some other examples, Pdf is a Rician probability distribution function. The use of other probability distribution functions not listed here is also contemplated, and the disclosure is not limited in this respect.

The probability distribution function Pdf introduced in Equation 8a above provides a probability that a wireless device is located at a particular location (x, y) would receive a signal with the measured signal strength SS$_i$ from a specific wireless transmitter (e.g., such as a wireless transmitter integrated with an access point) indicated by the index i. As example Pdf function is shown below as Equation 8b:

$$f(SS_i) = \frac{1}{\sigma\sqrt{2\pi}} e^{-\frac{1}{2}\left(\frac{ss-\mu}{\sigma}\right)^2} \qquad \text{Eq. 8b}$$

where:
SS$_i$—is an example value in the distribution (e.g., a signal strength measurement)
μ—is an expected mean of the values (e.g., a mean of signal strength measurements associated with a particular time period), which in this example is equal to "Int+PLE*log(d)", and
σ—is a standard deviation of the signal strength measurements.

The example Pdf function of Equation 8b implements a Gaussian distribution. As discussed above, other distribution functions may also be used, and the disclosure is not limited in this respect.

The SS$_i$ value in Equation 8b represents an individual (measured) value of the distribution, such as a signal strength value. The expected signal strength value μ for a signal transmitted from a wireless transmitter is provided by the right hand side of Equation 1. Substituting this value in for the SS$_i$ value of Equation 8b yields Equation 8c below. In some examples, the standard deviation of Equation 8b is set to a predetermined value. In some examples, a standard deviation value (e.g., σ) is determined as explained in greater detail below. A result of combining Equation 8b above with Equation 1 is provided below:

$$Pdf(SS_i, \text{Int}, PLE, d) = \frac{1}{\sigma\sqrt{2\pi}} e^{-\frac{1}{2}\left(\frac{\text{Int} + PLE*\log(d) - SS_i}{\sigma}\right)^2} \qquad \text{Eq. 8c}$$

where:
SS$_i$—a measured signal strength received by the device from a signal transmitted by an AP, and
Pdf (SS$_i$, Int, PLE, d)—a probability that a wireless device receives a signal with a signal strength SSi from a transmitter located at a distance d, when the signal path between the wireless device and the transmitter has characteristics defined by PLE and Int.

A determination of a distance between two wireless devices (e.g., a receiving device and a transmitting device) is provided by Equation 8d below:

$$d = \sqrt{(X_a - X_w)^2 + (Y_a - Y_w)^2} \qquad \text{Eq. 8d}$$

where:
(X$_a$, Y$_a$)—coordinates of a transmitting wireless device, such as an AP, and
(X$_w$, Y$_w$)—coordinates of a receiving wireless device.

Since in some examples the one or processors, such as one or more processors of LDS 180, derives values of unobserved states that maximize a value of a probability of Equation 8a, Equation 8a can be mapped into logarithmic domain where the multiplication of the exponential probability distribution function is converted into a summation of the various probabilities, resulting in a search of variables that maximize Equation 9 below:

$$\ln(P(o_t \mid u_t)) = \sum_{i=1}^{n} \ln(Pdf(ss_i \mid (x, y, PLF)_t)) \qquad \text{Eq. 9}$$

Applying Equation 9 to equation 7 results in Equation 10 below:

$$\text{Argmax}\left\{\sum_{i=1}^{n} \ln(Pdf(ss_i \mid (x, y, PLF)_t))\right\} = (x, y, PLF)_t \qquad \text{Eq. 10}$$

In accordance with one or more techniques of the disclosure, the one or more processors, such as one or more processors of LDS 180, thus determines a location that maximizes the probability represented by the expression of Equation 10. The location has either two or three unknowns depending on whether a two dimensional or a three dimensional location is being determined. The PLF parameter can include a variety of unknowns depending on the implementation. In some examples, the PLF parameter includes a path loss exponent (PLE) parameter. In some examples, the PLF parameters include an intercept parameter (e.g., Int). In some examples, the intercept parameter includes one or more components, including one or more of a receiver antenna gain parameter (e.g., G$_r$), a transmitter antenna gain parameter (e.g., G$_t$), and/or a transmit power parameter (e.g., P$_t$). Some examples solve for one or more of these parameters and/or other unknown parameters not shown in Equation 10. In some examples, the one or more processors, such as one or more processors of LDS 180, solves for one or more parameters that control the probability distribution function (e.g., control parameters such as a standard deviation, variance, or other parameters that control how the distribution is generated). For example, a variance or sigma of Pdf is treated as an unknown variable or an unobserved state and solved for.

In addition to the selection of a specific distribution function, some examples determine parameters that are specific to a type of probability distribution function. For example, in some examples utilizing a Gaussian distribution, a variance $\sigma^2$ is derived.

In accordance with one or more techniques of the disclosure, a one or more processors, such as one or more processors of LDS 180, solves for n unknown states or variables via n+1 known states, or signal strength measurements. Thus, in this example, to solve for wireless device coordinates x, y, along with PLE, Int, and $\sigma^2$ (a total of five variables in this example), six independent signal strength measurements from different APs are needed. When a wireless device does not receive enough independent signal strength values from different APs, a prioritization of unknown states or variables is made, and, in some examples, constant values are used for lower priority unknowns. For example, as discussed further below, some examples prioritize derivation of unknown control parameters of a probability distribution function lower than, for example, coordinate values of the wireless device itself, which would typically be the highest priority unknowns to solve for. Some examples substitute a recently derived value for an unknown variable that does not have sufficient priority to resolve in a particular iteration.

In some examples, one or more processors, such as one or more processors of LDS 180, solves Equation 10 by utilizing a grid search method, e.g., a gradient ascent algorithm which is a fast and computationally inexpensive method. Other examples utilize other computational methods, and the disclosure is not limited in this respect.

In some examples, one or more processors, such as one or more processors of LDS 180, implements a gradient ascent algorithm, which includes determination of derivatives of the probability distribution function with respect to the unknown variables/parameters.

$$\frac{d}{d(x, y, PLF)}\left(\sum_{i=1}^{n} (\ln(Pdf(ss_i \mid (x, y, PLF))_t))\right) = \qquad \text{Eq. 11a}$$

$$\sum_{i=1}^{n} \frac{d}{d(x, y, p_{LF})}(\ln(Pdf(ss_i \mid (x, y, PLF))_t))$$

$$\frac{d}{d(x)}\left(\sum_{i=1}^{n} \ln(Pdf(ss_i \mid (x, y, PLF))_t)\right) = \qquad \text{Eq. 11b}$$

$$\sum_{i=1}^{n} \frac{d}{d(x)}(\ln(Pdf(ss_i \mid (x, y, PLF))_t))$$

$$\frac{d}{d(y)}\left(\sum_{i=1}^{n} \ln(Pdf(Pdf(ss_i \mid (x, y, PLF))_t)) = \qquad \text{Eq. 11c}$$

$$\sum_{i=1}^{n} \frac{d}{d(y)}(\ln(Pdf(ss_i \mid (x, y, PLF))_t))$$

$$\frac{d}{d(\text{Int})}\left(\sum_{i=1}^{n} \ln(Pdf(ss_i \mid (x, y, PLF))_t)\right) = \qquad \text{Eq. 11d}$$

$$\sum_{i=1}^{n} \frac{d}{d(\text{Int})}(\ln(Pdf(ss_i \mid (x, y, PLF))_t))$$

$$\frac{d}{d(PLE)}\left(\sum_{i=1}^{n} \ln(Pdf(ss_i \mid (x, y, PLF))_t)\right) = \qquad \text{Eq. 11e}$$

$$\sum_{i=1}^{n} \frac{d}{d(PLE)}(\ln(Pdf(ss_i \mid (x, y, PLF))_t))$$

To identify values of the unknowns that maximize the probability represented by Equation 10, some examples search for values that result in first derivatives (as represented by Equations 11a-e) that equals zero or equals a value within a predefined threshold of zero.

Once the derivatives with respect to each unknown variable of Equations 11a-e (or equations 19a-e) are evaluated, a gradient ascent method is performed, at least in some examples, to identify values that result in the derivatives being equal to zero. The gradient ascent method performs iterations represented by the index k below with respect to Equations 12a-d:

$$x_k = x_{k-1} - \alpha * \sum_{i=1}^{n} \frac{d}{d(x)}\left(\ln\left(Pdf(ss_i \mid (x, y, PLF))\right)_{k-1}\right) \qquad \text{Eq. 12a}$$

$$y_k = y_{k-1} - \alpha * \sum_{i=1}^{n} \frac{d}{d(y)}\left(\ln\left(Pdf(ss_i \mid (x, y, PLF))\right)_{k-1}\right) \qquad \text{Eq. 12b}$$

$$\text{Int}_k = \text{Int}_{k-1} - \alpha * \sum_{i=1}^{n} \frac{d}{d(\text{Int})}\left(\ln\left(Pdf(ss_i \mid (x, y, PLF))\right)_{k-1}\right) \qquad \text{Eq. 12c}$$

$$PLE_k = PLE_{k-1} - \alpha * \sum_{i=1}^{n} \frac{d}{d(PLE)}\left(\ln\left(Pdf(ss_i \mid (x, y, PLF))\right)_{k-1}\right) \qquad \text{Eq. 12d}$$

where:
$\alpha$—is a scale factor to moderate a step size between each iteration of the gradient ascent.

Rather than estimating the intercept parameter Int, some examples recognize that the intercept is a composition of components. Some of these components are dependent on the location of the wireless device while other components depend on a transmission power of the respective wireless transmitter. Still other components depend on other factors. For example, gain components of the intercept parameter depend on an orientation of a transmitting and/or receiving antenna.

Referring to the Friis formula:

$$Pr(d) = Pt * Gt * Gr * (\lambda / (4 * \pi * d))^2 \qquad \text{Eq. 13}$$

where:
Pr—a received power of a signal at the receiving wireless device,
Pt—a transmission power of the signal,
Gt—a gain of a transmit antenna as measured at a position of the receiving wireless device,
Gr—a gain of the receiving device towards the transmitting device,
$\lambda$—a wavelength of the radio signal, and
d—a distance between the transmitter and the receiver.

To change the units to decibels (dB), Equation 13 is modified as shown below with respect to Equation 14:

$$Pr(d) = Pt + Gt + Gr + 20 * \text{Log}(\lambda / (4 * \pi * d)) \qquad \text{Eq. 14}$$

A representation of the Int parameter is derived via Equation 1 and Equation 14, as $$\text{Int}_i = Pt_i + Gt_i(rx, ry, tx_i, ty_i, tox_i, toy_i) + \qquad \text{Eq. 15}$$
$$Gr_i(rx, ry, rox, roy, tx_i, ty_i) + Const$$

where:
- i—an index identifying a unique path between the wireless device and a specific transmit antenna,
- $tx_i$, $ty_i$—coordinates of transit antenna i,
- rx, ry—coordinates of a receive antenna,
- rox, roy—an orientation of the receive antenna with respect to x, y,
- $tox_i$, $toy_i$—an orientation of the ith transmit antenna with respect to x, y,
- $Pt_i$ a transmit power of a signal generated by a wireless transmitter i,
- $Gt_i(rx, ry, tx_i, ty_i, tox_i, toy_i)$—a gain of a transmit antenna i at position (tx, ty) and an orientation of tox, toy (with respect to a common x, y axis as tx, ty). The gain is determined as received by a receive antenna at position (rx, ry),
- $Gr_i(rx, ry, rox, roy, tx_i, ty_i)$—a gain of a receiving antenna at position (rx, ry) having an orientation of rox, roy. The gain with respect to a direction of the signal arriving from a direction of position (tx, ty), and
- Const—a constant value term, $20*Log(\lambda/4*\pi)$, that depends on the frequency of the signal.

Thus, as shown above, in accordance with one or more techniques of the disclosure, each signal path between a transmitter and a receiver has an independent intercept parameter, shown as Inti. This independent intercept parameter is a function of the transmit power, as well as a position and orientation of each of the transmitting antenna and receiving antenna.

A gain of a transmitting radio towards a location is a function of the location and more specifically of a relative position of the transmitting antenna and a location of a receiving antenna. The transmission power is an independent value. In some examples, a transmit power of a transmit antenna (e.g., included in an access point) is communicated, either directly or indirectly, to the LDS. A receive antenna gain depends on an orientation of the antenna with respect to the transmit antenna.

Note that for simplicity, Equation 15 is written with two dimensions of coordinates but can be modified to include a third dimension. For example, Equation 15 can be written to include a third dimension for positions of the receive antenna and transmit antennas (e.g., rx, ry, rz, and tx, ty, and tz), as well as a third dimension for orientation (e.g., rox, roy, roz, and tox, toy, and toz). In some examples, one or more processors, such as one or more processors of LDS 180, estimates a location of a wireless device in three dimensions and would thus rely on the three dimensions version of Equation 15.

In accordance with one or more techniques of the disclosure, additional variables are introduced in some examples to represent generalized approximations of the receiver antenna gain, transmit antenna gain, and transmit power parameters described above that are functions of each transmit antenna location. Thus, while Equation 16 shows different transmit antenna gain, receiver antenna gain, and transmit power parameters for each transmit antenna responsible for a signal that is included in the signal strength measurements of Equations 11a-e, and 12a-d, and Equation 18a-e and 19a-d, some examples utilize a single approximation for one or more of these parameters that does not vary based on the transmit antenna (and its signal) being considered.

As explained above in reference to Equation 15, and in greater details below, the intercept consists of multiple partial parameters. Some of the partial parameters can be calculated (or determined) for each path between a transmitting AP and a receiving wireless device, based on other parameters such as the location of the wireless device, or based on the transmission power of a specific AP. These parameters are referred to herein as DetParm(s). The other parameters, referred to herein as UnknownParm(s), are unknown parameters for which one or more processors, such as one or more processors of LDS 180, calculates one single value that is best representation of all of the different partial parameters for each one of the paths between the different APs and the wireless device.

$$\text{Int}_i = UnknownParm + DetParms_i \qquad \text{Eq. 16}$$

where:
- $\text{Int}_i$—an index identifying a unique path between the wireless device and a specific transmit antenna,
- UnknownParm—an unknown parameter for which the method calculates one single value that is a best representation of all of the different partial parameters for each one of the paths between the different APs and the wireless device, and
- $DetParms_i$—Partial intercept parameter which can be determined either directly (e.g., transmission power) or by a calculation based on a given location of a wireless device and or antenna pointing direction.

In some examples, a parameter IntPtGr* is defined to represent a single approximation according to Equation 17a as below:

$$\text{Int}PtGr^* = \text{approx.} \left( \sum_{i=1}^{n} (Pt_i + Gr_i(rx, ry, rox, roy, tx_i, ty_i)) \right) \qquad \text{Eq. 17a}$$

where:
- approx. ( )—a function that provides a single value approximation of an aggregation of transmit power (Pt) for wireless transmitters included in the analysis and receive gain (Gr) at a particular receiver location (e.g., rx, ry) with respect to the wireless transmitters.

Substituting Equation 17a into Equation 15 results in Equation 17b below:

$$\text{Int}_i(rx, ry, tx, ty, tox, toy) = \text{Int}PtGr^* + Gt_i(rx, ry, tx, ty, tox, toy) \qquad \text{Eq. 17b}$$

where:
- IntPtGr*—is a single approximation of transmit power and receiver antenna gain that is applied to signals received from (e.g., all) the transmit antennas considered by a gradient descent method.

As shown above, Equation 17b substitutes an intercept parameter that is dependent on characteristics of a signal path between a transmit antenna and receive antenna with the term IntPtGr* which is a single approximation of some components of the Intercept parameter, which is applied to multiple different signal paths between multiple transmit antennas and a receive antenna during derivations performed by at least some of the disclosed examples. Thus, Equation 17b takes advantage of some known components of the intercept parameter. In particular, 17b utilizes transmitter antenna gain information with respect to locations of a transmit antenna and receive antenna. Different transmit gain information is then computed for each signal considered by the above derivation of location, and this different transmit gain information is combined with the single approximation of remaining components of the intercept parameter (e.g., IntPtGr*) when deriving the location.

In some examples, an IntPtGt* approximation parameter is derived according to Equation 17c below:

$$Int_i(rx, ry, rox, roy, tx, ty) = IntPtGt^* + Gr_i(rx, ry, rox, roy, tx, ty) \quad \text{Eq. 17c}$$

where:
 IntPtGt*—is a single approximation of a transmit power and transmit gain that is applied to signals received from (e.g., all) the transmit antennas considered by a gradient descent method.

Thus, these examples derive a single approximation for transmit power and transmit antenna gain parameters that is applied to multiple signals from multiple different transmitters during derivation of the location.

In some examples, an IntPt* approximation parameter is derived according to Equation 17d as below:

$$Int_i(rx, ry, rox, roy, tx, ty) = \quad \text{Eq. 17d}$$
$$IntPt^* + Gt_i(rx, ry, tx, ty, tox, toy) + Gr_i(rx, ry, rox, roy, tx, ty)$$

where:
 IntPt*—is a single approximation of transmit power applied to signals received from (e.g., all) the transmit antennas considered by a gradient descent method.

In some examples, an IntGt* approximation parameter is derived according to Equation 17e as below:

$$Int_i(rx, ry, rox, roy, tx, ty) = \quad \text{Eq. 17e}$$
$$IntGt^* + Pt_i + Gr_i(rx, ry, rox, roy, tx, ty)$$

where:
 IntGt*—is a single approximation of transmit gain that is applied to signals received from (e.g., all) the transmit antennas considered by a gradient descent method.

In some examples, an IntGr* approximation parameter is derived according to Equation 17f as below:

$$Int_i(rx, ry, rox, roy, tx, ty) = \quad \text{Eq. 17f}$$
$$IntGr^* + Pt_i + Gt_i(rx, ry, tx, ty, tox, toy)$$

where:
 IntGr*—is a single approximation of receiver antenna gain that is applied to signals received from (e.g., all) the transmit antennas considered by a gradient descent method.

In some examples, a transmission power from one or more wireless transmitters is known. For example, the transmission power is obtained, in some examples, via an exchange of information over a network between an access point (that includes the wireless transmitter) and the location determination server (LDS). Thus, in some examples, the transmission power is obtained by one or more processors, such as one or more processors of LDS 170/350, either directly, from the access point, or indirectly, by a management device, such as NMS 130/300. In other examples, the wireless transmitter and/or access point is queried directly to obtain the transmission power of one or more signals. When the transmission power of a signal is known, Equation 16 can be modified as shown below with respect to Equation 17g:

$$Int_i(rx, ry, rox, roy, tx, ty) = IntGrGt^* + Pt^i \quad \text{Eq. 17g}$$

where:
 IntGrGt*—is a single approximation of transmitter antenna gain and a receiver antenna gain that is applied to signals received from (e.g., all) the transmit antennas considered by a gradient descent method.

As discussed above, while the various Equations 17a-17g show representations in two dimensions, these equations could be modified to operate in three dimensions, and some of the disclosed examples would utilize three dimensional versions of one or more of these equations to derive a location of a wireless device in three dimensions, and the disclosure is not limited in this respect.

Using any one or more of the single approximation parameters shown above in Equations 17a-17g rather than estimating the broader intercept parameter as a whole using Equation 12c improves an accuracy of a location estimation relative to a second location which would result if the entire intercept parameter as a whole were derived (e.g., using Equation 12c as written). In the discussion below, the term Int' is used as a generic placeholder for any one of the intercept component approximations discussed above (e.g., IntPtGr*, IntPtGt*, IntPt*, IntGt*, IntGr*, or IntGrGt*).

As described further below, some examples perform a gradient ascent to identify a set of unknown parameter values that maximize a location of a wireless device. As there is generally insufficient data available to derive unknown states specific to each signal path, in some examples, each iteration of the gradient ascent utilizes a generic approximation of at least one path loss function parameter. In some examples, one or more processors, such as one or more processors of LDS 170/350, derives a value of the Intercept parameter as a whole. In other examples, one or more processors, such as one or more processors of LDS 170/350, derives a value for Int', with Int' representing one or more of IntPtGr*, IntPtGt*, IntPt*, IntGt*, IntGr*, or IntGrGt* as discussed above.

In the example below, one or more processors, such as one or more processors of LDS 170/350, determines a transmitter antenna gain value based on, at least in part, a location (e.g., (x, y) or (x, y, z)). The transmitter antenna gain value is based on x, and y values (e.g., a location of the wireless device) which is also estimated via Equations 19a, and 19b (for sake of simplicity the equation does not specifically describes the iterative estimation of the z coordinate). Thus, as shown in table one, when the transmitter antenna gain value is determined, some disclosed examples derive a value for IntPtGr*.

In some examples, the Int' parameter includes an approximation of receiver antenna gain and of transmit power. Thus, these examples may compensate for a fluctuation in transmit power (e.g., due to a change in an environment between the transmit antenna and receive antenna). This compensation occurs because as the environment changes, signal strength measurements processed by the gradient ascent method will also change, resulting in changes to a derived value for the Int' parameter. Similarly, since the Int' parameter approximation includes a receiver antenna gain component, and the receiver antenna gain is dependent on an orientation of the receive antenna, the derived Int' parameter will change as the orientation of the wireless device changes (again as a result of changing signal strength measurements resulting from the change in orientation of the wireless device).

Equations 18a-e and 19a-d below provide an example set of equations that derive, instead of the Intercept parameter as a whole, various components of the intercept parameter (e.g., IntPtGr*, IntPtGt*, etc.):

TABLE 1

| Unknown Parameter (UnknownParm*) | Definition of Unknown Parameter | Determined Intercept Components (DetParms) |
|---|---|---|
| Int | Include all intercept parameter components | None |
| IntGrGt* | Generalized approximation of a receiver antenna gain and a transmit antenna gain components of the intercept parameter | $i = {}_1^n Pt_i$ |
| IntPtGt* | Generalized approximation of a transmit power and a transmit antenna gain components of the intercept parameter | $i = {}_1^n Gr_i(x, y, rox, roy, tx_i, ty_i)$ |
| IntPtGr* | Generalized approximation of a transmit power and a receiver antenna gain components of the intercept parameter | $Gt_i(x, y, tx_i, ty_i, tox_i, toy_i)$ |
| IntPt* | Generalized approximation of a transmit power component of the intercept parameter | $i = {}_1^n Gr_i(x, y, rox, roy, tx_i, ty_i)$ and $i = {}_1^n Gt_i(x, y, tx_i, ty_i, tox_i, toy_i)$ |
| IntGr* | Generalized approximation of a receive antenna gain component of the intercept parameter | $i = {}_1^n Pt_i$ and $Gt_i(x, y, tx_i, ty_i, tox_i, toy_i)$ |
| IntGt* | Generalized approximation of a transmit antenna gain component of the intercept parameter. | $i = {}_1^n Pt_i$ and $i = {}_1^n Gr_i(x, y, rox, roy, tx_i, ty_i)$ |

In the example formulas below, variables "DetParms" and "UnknownParm" are introduced to show that one or more determined parameters (e.g., "DetParms") of a row and the right hand column of Table 1 above are mapped by a Pdf function to a probability based on Unknown intercept components (represented by the "UnknownParm*" in the same row and the left hand column of Table 1) that are derived in a particular example (e.g., the left column of Table 1 above maps to which Unknown Intercept component(s) are derived by Equations 18a-e and 19a-d below, and the right column of Table 1 above indicates a value of the DetParms parameter given the derived Intercept component.

$$\frac{d}{d(x, y, PLF')}\left(\sum_{i=1}^{n}\left(\ln\left(Pdf(ss_i|(x, y, DetParms_i, PLF'))_t\right)\right)\right) = \quad \text{Eq. 18a}$$

$$\sum_{i=1}^{n} \frac{d}{d(x, y, p_{LF'})}\left(\ln\left(Pdf(ss_i|(x, y, DetParms_i, PLF'))_t\right)\right)$$

$$\frac{d}{d(x)}\left(\sum_{i=1}^{n}\left(\ln\left(Pdf(ss_i|(x, y, DetParms_i, PLF'))_t\right)\right)\right) = \quad \text{Eq. 18b}$$

$$\sum_{i=1}^{n} \frac{d}{d(x)}\left(\ln\left(Pdf(ss_i|(x, y, DetParms_i, PLF'))_t\right)\right)$$

$$\frac{d}{d(y)}\left(\sum_{i=1}^{n}\left(\ln\left(Pdf(Pdf(ss_i|(x, y, DetParms_i, PLF'))_t\right)\right)\right) = \quad \text{Eq. 18c}$$

$$\sum_{i=1}^{n} \frac{d}{d(y)}\left(\ln\left(Pdf(ss_i|(x, y, DetParms_i, PLF'))_t\right)\right)$$

$$\frac{d}{d(UnknownParm*)}\left(\sum_{i=1}^{n}\left(\ln\left(Pdf(ss_i|(x, y, DetParms_ie, PLF'))_t\right)\right)\right) = \quad \text{Eq. 18d}$$

$$\sum_{i=1}^{n} \frac{d}{d(UnknownParm*)}\left(\ln\left(Pdf(ss_i|(x, y, DetParms_i, PLF'))_t\right)\right)$$

$$\frac{d}{d(PLE)}\left(\sum_{i=1}^{n}\left(\ln\left(Pdf(ss_i|(x, y, DetParm_i, PLF'))_t\right)\right)\right) = \quad \text{Eq. 18e}$$

$$\sum_{i=1}^{n} \frac{d}{d(PLE)}\left(\ln\left(Pdf(ss_i|(x, y, DetParm_i, PLF'))_t\right)\right)$$

where:
PLF'—one or more path loss function parameters (e.g., a path loss exponent parameter and/or an intercept parameter or an UnknownParm parameter),
DetParms—Defined by the right hand column of Table 1 above, and
UnknownParm*—Defined by the left hand column of Table 1 above.

The PLF' parameter(s) in Equations 18a-18e above rely on a generalized approximation of a PLE parameter and on a signal path dependent intercept parameter (e.g., UnknownParm*+DetParms) in the above example.

As discussed above, in some examples, one or more processors, such as one or more processors of LDS 170/350, utilizes a gradient ascent method to identify values of the unknown parameters that maximize a probability of a device being in a particular location. While Equations 11a-11e and 12a-12d provided one example set of equations used by some examples, other examples rely on Equations 18a-18e discussed above, along with Equations 20a-20d discussed below, which derive values for UnknownParm* and use it to obtain a value for Int' (whereas Equations 11a-e and 12a-d derive a value for the intercept parameter Int).

$$x_k = \quad \text{Eq. 19a}$$

$$x_{k(-1)} - \alpha * \sum_{i=1}^{n} \frac{d}{d(x)}\left(\ln\left(Pdf(ss_i|(x, y, DetParms_i, PLF'))_{k-1}\right)\right)$$

$$y_k = \quad \text{Eq. 19b}$$

$$y_{k(-1)} - \alpha * \sum_{i=1}^{n} \frac{d}{d(y)}\left(\ln\left(Pdf(ss_i|(x, y, DetParms_i, PLF'))_{k-1}\right)\right)$$

$$UnknownParm_k^* = \quad \text{Eq. 19c}$$

$$UnknownParm_{(k-1)}^* - \alpha * \sum_{i=1}^{n} \frac{d}{d(IUnknownParm*)}$$

$$\left(\ln\left(Pdf(ss_i|(x, y, DetParms_i, PLF'))_{k-1}\right)\right)$$

-continued $$PLE_k = PLE_{(k-1)} - \alpha * \sum_{i=1}^{n} \frac{d}{d(PLE)}$$ Eq. 19d $$\left(\ln(Pdf(ss_i|(x, y, DetParms_i, PLF'))\right)_{k-1})$$

where:
- α—a scale factor to moderate the step size between each iteration of the gradient ascent,
- UnknownParm*—an approximated intercept value or intercept component value (e.g., IntGrGt*, IntPtGt*, IntPt*, IntPtGr, IntGt*, IntGr*) under the assumption that all paths between the various transmitters and the wireless device share the same intercept Int' value, as specified in a row of Table 1 above, and
- DetParms—one or more parameters that are computed, and not derived in the continuous domain, as specified in the row of Table 1.

Convergence

In some examples, one or more processors, such as one or more processors of LDS 170/350, iteratively determines whether the derivative(s) have a zero value (e.g., by evaluating any one or more of Equations 12a-12i). The index k is incremented until a difference in estimated values of the unknown parameters from a previous iteration is smaller than a predefined threshold. In some examples, a change in a parameter's estimated value is compared to a threshold specific to the particular parameter. If all parameters being estimated changed by an amount less than their respective threshold, then the gradient ascent is considered complete or converged. At convergence, optimal values of the unobserved variables have been identified. This convergence also indicates a location of the wireless device via the derived x, y, (and possibly z) coordinate values.

Some examples define a range of values of one or more PLF parameters based on physical properties of a particular location. An example of such a range is a constraint on a path loss exponent (PLE) parameter as shown below with respect to Equation 21:

$$-50 < PLE < -20$$ Eq. 21

If a value of an unknown variable (e.g., unobserved state) is determined to be outside a permissible range, some examples determine that the gradient ascent algorithm failed to converge and rely on a second value of the unknown variable which was determined, in some examples, by a previous iteration (e.g., a value derived at time t−1 is substituted for an out of range value determined at time t). Some examples determine that the gradient ascent failed to converge if after a predetermined number of iterations (e.g., 10,000), the difference between the values of the unknown variables in consecutive iterations is still greater than a predetermined threshold.

Figure 8:
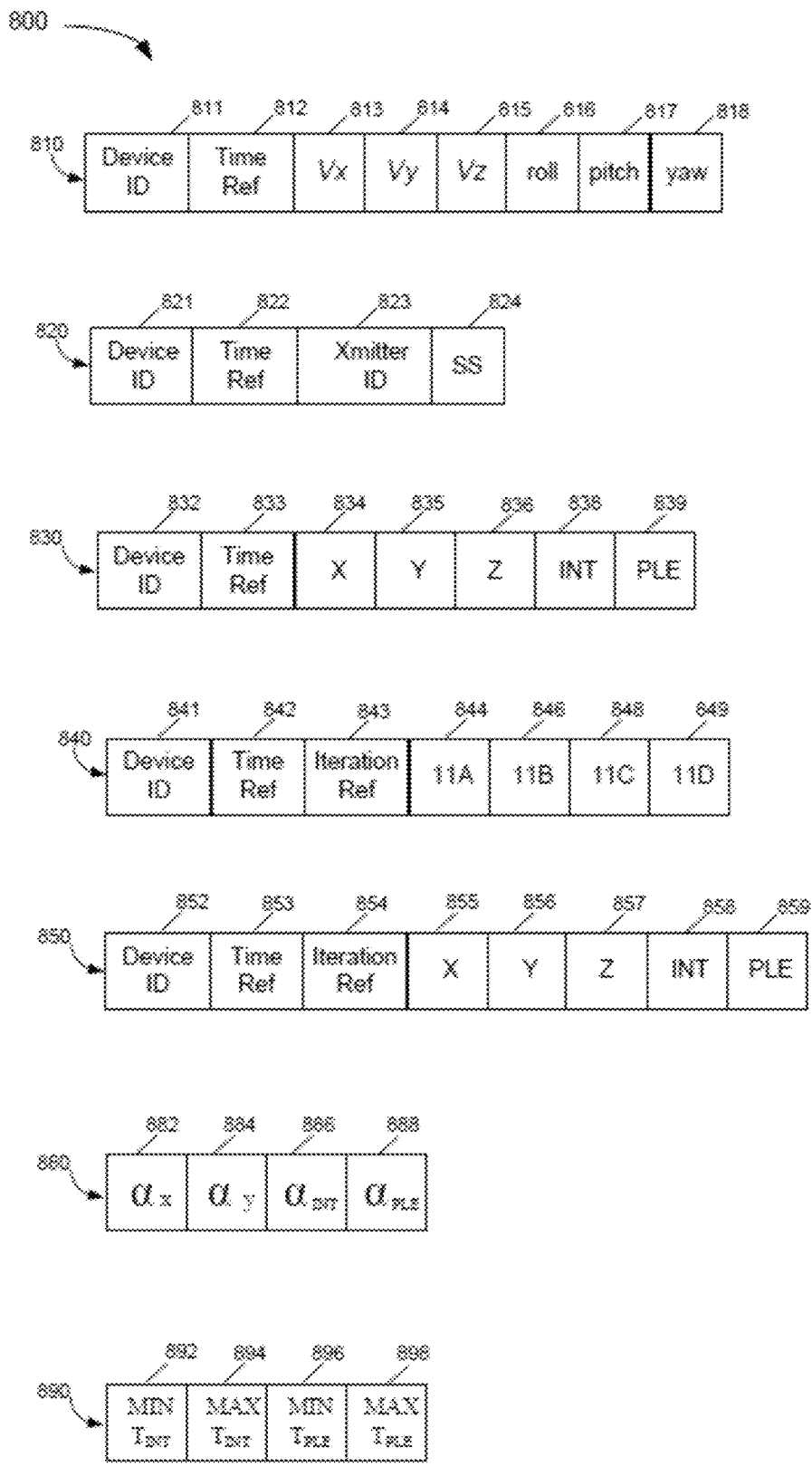
FIG. 8 shows example data structures in accordance with one or more techniques of the disclosure.

FIG. 8 shows example data structures 800 implemented by one or more processors, such as one or more processors of LDS 170/350, in accordance with one or more techniques of the disclosure. While specific example data structures are discussed, a variety of different data structure types could be substituted for the specific data structures described herein, including traditional in-memory data structures such as linked lists, arrays, graphs, trees, or a non-structured data structure, hierarchical data store, object oriented data store, serialized data storage, relational database tables, or any other data structure architecture, and the disclosure is not limited in this respect.

FIG. 8 includes a device velocity and orientation table 810, an observed states table 820, a derived states table 830, a temporary derivatives table 840, a temporary derived values table 850, an increment table 880, and a threshold table 890. The device velocity and orientation table 810 stores velocity and orientation information relating to a particular device. The particular device is identified via a device identifier field 811. A time reference field 812 identifies a particular time reference to which the velocity data pertains. The velocity information is represented by velocities in at least two dimensions. The device velocity and orientation table 810 shows three dimensions as fields 813, 814, and 815 storing velocities in an x, y, and z dimension respectively. The device velocity and orientation table 810 also stores orientation information relating to orientation in roll, pitch, and yaw in fields 816, 817, and 818 respectively. In some examples, the orientation information stored in fields 816, 817 and/or 818 is received in one or more messages received from the wireless device identified via the device identifier field 811. The orientation information is useful, in some examples, in determining a receiver antenna gain parameter based on the orientation of the device with respect to a transmit antenna location and a location of the wireless device.

The observed states table 820 includes a device identifier field 821, time reference field 822, a wireless transmitter identifier field 823, and a signal strength field 814. The device identifier field 821 identifies a device for which the signal strength information stored in the observed states table 820 pertains. The time reference field 822 stores a time reference for which the signal strength information pertains. The wireless transmitter identifier field 823 identifies a wireless transmitter that generated the signal(s) whose measurements are reflected in the signal strength field 824. In some example, the wireless transmitter identifier field identifies an AP having a single wireless transmitter. In other examples, a single AP includes multiple wireless transmitters, with each wireless transmitter identified by a different row of the observed states table 820.

The derived states table 830 includes a device identifier field 832, time reference field 833, x coordinate field 834, y coordinate field 835, z coordinate field 836, intercept field 838, and a PLE field 839. The derived states table 830 determines the "final" values of unknown variables for a particular time period indicated by the time reference field 833. Thus, in some examples, the derived states table 830 can include more or derived states than the example illustrated in FIG. 8. For example, as discussed above, some examples derive values for variables that control a probability distribution. While not shown in the example derived states table 830, some examples would include a derived states table including fields for one or more of these types of derived values. Further note that one or more of the Intercept field 838 and/or PLE field 839, while shown as single value fields, store, in various examples, multiple values. For example, as discussed above, an intercept parameter is comprised of multiple components, any one or more of which are stored in the intercept field 838 in at least some examples.

The temporary derivatives table 840 stores derivative information generated as part of the disclosed identification of a maximum probability. In some examples, the temporary derivatives table store data representing one or more of the Equations 11a-e (or Equations 18a-c), discussed above. The temporary derivatives table 840 includes a device identifier field 841, time reference field 842, iteration reference field 843, and multiple derivatives fields. In the example of FIG. 8, shown as derivatives with respect to an x coordinate 844, derivatives with respect to a y coordinate in field 846, derivatives with respect to an Intercept parameter via field 848, and derivatives with respect to a PLE parameter via field 849. Other examples store other derivatives.

The temporary derived values table 850 includes a device identifier field 852, time reference field 853, iteration reference field 854, x coordinate field 855, y coordinate field 856, z coordinate field 857, intercept parameter field 858, and path loss exponent field 859. The temporary derived values table 850 stores intermediate values determined during performance of a gradient ascent method, as described above. The iteration reference field 854 stores, in some examples, a value of the variable k discussed above when one or more of the derived values of the fields 855, 856, 857, 858, or 859 are determined.

The increment table 880 stores a step-size parameter a that controls the convergence characteristics of a gradient ascent as discussed above. For example, increment table 880 shows an example storing four different step-size parameters or a values, a step-size parameter value for an x coordinate in field 882, a step-size parameter value for determining a y coordinate in field 884, a step-size parameter value for determining an intercept parameter in field 886, and an increment value for determining a PLE parameter in field 888.

The threshold table 890 stores minimum and maximum threshold values for determined intercept and PLE parameters. Other examples establish minimum and/or maximum threshold values for other derived parameters, such as probability distribution parameters such as a variance or sigma. Table 890 includes a minimum threshold for an intercept parameter field 892, a maximum threshold for the intercept parameter field 894, a minimum threshold for a PLE parameter in field 896, and a maximum threshold for a PLE parameter in field 898.

Figure 9:
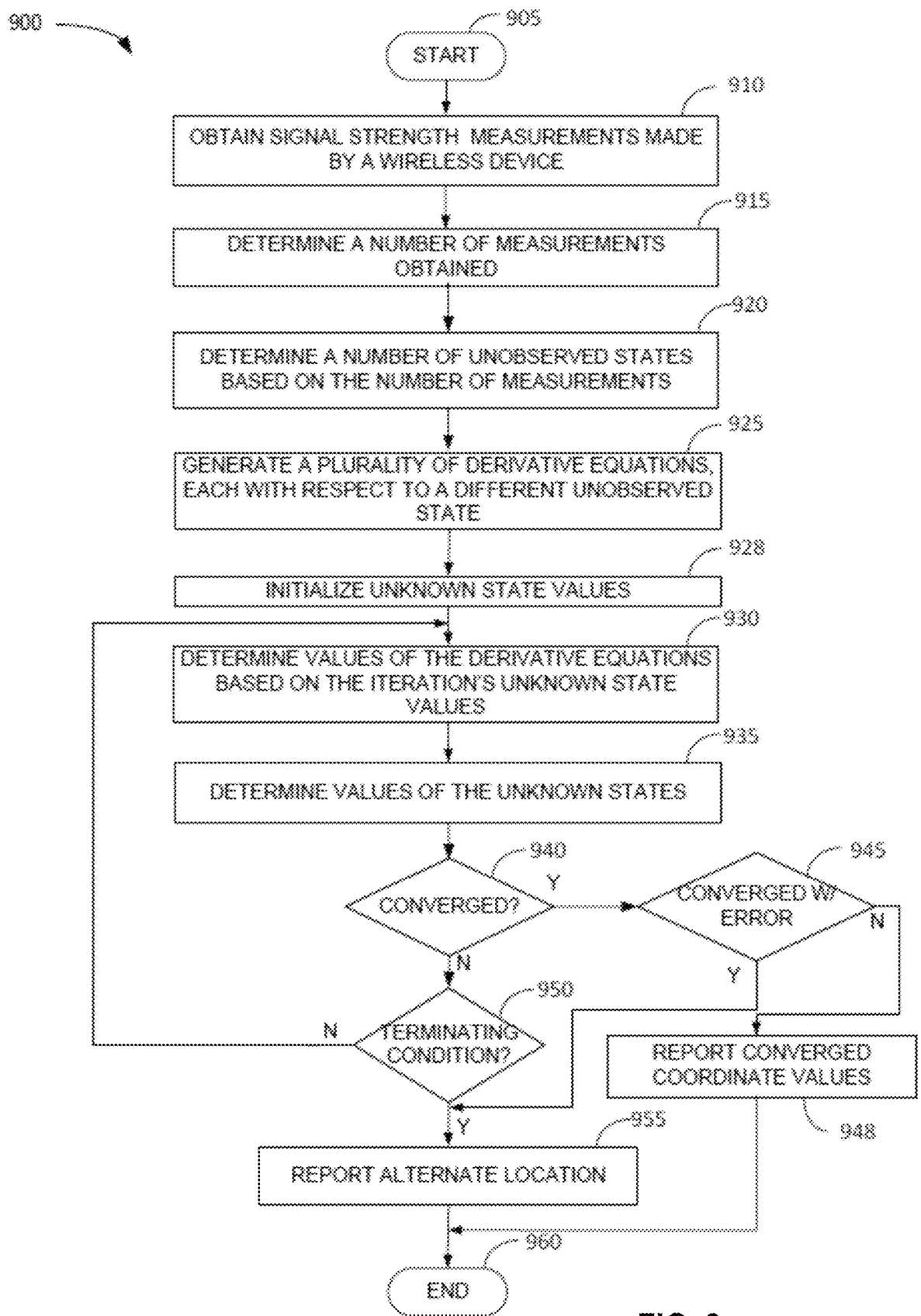
FIG. 9 is a flowchart of an example process by which one or more processor(s) of a location server determines the location of a wireless device in accordance with one or more techniques of the disclosure.

FIG. 9 is a flowchart (900) of example operations performed by one or more processors of a location determination system to determine the location of a wireless device. One or more of the operations may be performed by, for example, one or more processors 396 of LDS 170/350 as shown in FIG. 3B. For example, the one or more processors 396 may execute location determination module 380 of LDS 170/350 to perform one or more of the operations discussed with respect to FIG. 9. For purposes of the present disclosure, an example of operations (900) being performed by LDS 170/350 will be described.

By execution of example process (900) of FIG. 9, LDS 170/350 determines a location of a wireless device in an environment in which path loss functions are location and/or time dependent. Thus, example process (900) provides for improved accuracy in location determinations of wireless devices relative to other methods that do not compensate for the time and/or location variability of path loss functions. By executing process (900), one or more processors, e.g., processors 396 of LDS 170/350, determine unknown state values relevant to a particular time period (e.g., t in the description above).

After start operation (905), LDS 170/350 obtains signal strength measurement information associated with one or more wireless signals received by a wireless device for which the location is to be determined (910). The signal strengths are measured at the wireless device. In some examples, the signal strength measurements are in the form of received signal strength indications (RSSIs). In generally, the signal strength measurements are of signals received by the wireless device and generated by a plurality of wireless transmitters. In some examples, at least some of the wireless transmitters are included in access points. Locations of the wireless transmitters are known, while a location of the wireless device receiving the signals is not known. As discussed above, the location of the wireless device is unknown, in some circumstances, because the wireless device is operating inside a building, and is not able to use its global positioning receiver to establish its position. In some examples, the signal strength measurements are obtained by the LDS 170/30 through receipt of one or more messages transmitted from the wireless device (e.g., via an access point) to LDS 170/350, discussed above with respect to FIGS. 1 and 3B. The one or more messages indicate the signal strength measurements as determined by the wireless device. The one or more messages also indicate from which wireless transmitter(s) the signal(s) originated that resulted in the signal strength measurement(s). In some examples, a time is associated with each of the signal strength measurements. The time is also indicated in the one or more messages in some examples. In other examples, a time the message is received by the location determination server (e.g., LDS 170/350) is associated with the measurements. In some examples, one or more messages are received that indicate an orientation of the wireless transmitter(s). For example, some wireless devices, such as smart phones, include orientation determining equipment, such as accelerometers, orientation sensors, and/or electronic compasses. These wireless devices, in some examples, collect information from these sensors and provide it, via one or more network messages, to a back-end system and/or an access point. This information then makes its way to a device executing example process (900), such as LDS 170/350. As discussed below, the orientation information is used, in some examples, to determine a receiver antenna gain parameter.

In some examples, one or more messages are received in operation (910) that indicate a velocity and direction of the wireless device. As discussed below, this velocity and direction information is used, in some examples, to infer a location of a wireless device, or to affect a probability that the wireless device is in a particular location.

In some examples of operation (910), the signal strength measurements include transmit power information. For example, the signal strength measurements obtained in operation (910) result from measurements of signals from the one or more wireless transmitters. LDS 170/350, or other device performing example process (900), in some examples, is in communication, either directly or indirectly, with a device including said wireless transmitters (such as an access point). From this communication, LDS 170/350 receives transmit power information. The LDS 170/350 also receives, in some examples, orientation information relating to the orientation of one or more of the wireless transmitter(s). From this orientation information, the LDS 170/350 calculates, in some examples, transmit antenna gain information, which is a component of an intercept parameter. Transmit power is also a component of the intercept parameter. Determination of an intercept parameter value based on components is discussed in more detail below.

LDS 170/350 determines a number of measurements obtained for a given time period (915). LDS 170/350 analyzes the obtained measurements of operation (910) to determine which of those measurements can be used to derive one or more unknown state values relevant to a particular time period. As discussed above, in some examples, when the measurements are obtained, the measurements are associated with a particular time period. For example, a network message transmitted by the wireless device to a location determination server includes, in some examples, one or more signal strength measurements, and an indication of a particular time period each of the one or more signal strength measurements is associated with. In some examples, a time the message is received is used to determine a time associated with the signal strength measurements included in the message.

LDS 170/350 derives a number of unobserved states that can be derived from the determined number of measurements (920). For example, LDS 170/350 derives n unknown state values from n+1 signal strength measurements (known or observed states).

In executing operation (920), LDS 170/350 also selects unknown variables to derive based on the number of unobserved states. In some examples, LDS 170/350 prioritizes unknown states and selects the highest priority states to derive. Determination of the priority of the various states is discussed in greater details below with reference to FIG. 10. In some of these examples, one or more states that cannot be derived based on the determined number are assigned predefined values, such as constant values. Alternatively, a most recently derived state of the unknown state is used. In some examples, velocity and direction information about the wireless device is used, in combination with a most recently derived location of the wireless device, to approximate the wireless device's location. Thus, some examples prioritize the unknown states based on a recency of the particular state's determination.

In some examples, each state is assigned an individual weight, and the weight and a time of most recent derivation are used to determine a priority of the unknown state. Additional methods of selecting which unknown states to derive, based on a set of signal strength measurements, are discussed below with respect to FIG. 10. Note that the prioritization of unknown states for derivation discussed with respect to operation (920) is wireless device specific. Thus, in some examples, a first plurality of unknown states associated with a first wireless device are prioritized for derivation in/for the particular time period, and a second different plurality of unknown states associated with a second wireless device are prioritized for derivation in/for the particular time period.

In some examples, LDS 170/350 prioritizes derivation of an intercept parameter based on which components of the intercept parameter are available. As discussed above, components of the intercept parameter include a receiver antenna gain, transmit antenna gain, and a transmit power. Thus, if, for example, LDS 170/350 has available to it receiver antenna gain information, derivation of the intercept parameter itself is deprioritized in favor of deriving missing components of the intercept parameter. As discussed above, some examples obtain orientation information of the wireless device. In some examples, a model number of the wireless device also allows mapping from the wireless device's location, orientation relative to a known transmitter location, and model, to a receiver antenna gain parameter. If this information is available, some examples prioritize derivation of, for example, a transmit power parameter and/or a transmit antenna gain parameter over the intercept parameter. By deriving some intercept parameter components instead of the intercept parameter as a whole, a total variability (error) in the resulting parameter estimates is reduced.

LDS 170/350 generates a plurality of derivative equations, with each equation with respect to a different unknown state (925). In some examples, LDS 170/350 determines equations that each reference a different signal strength measurement. In some examples, each of the generated equations also references a probability distribution function. The referenced probability distribution function includes, as parameters, the unknown states selected for derivation by operation 920. Thus, the equations determine a probability that unknown states have particular values given the specific signal strength measurement. These equations are then aggregated in some manner. In some examples, the aggregation is performed in a manner analogous to the example provided with respect to Equation 8a. Equation 8a includes a plurality of equations, with each equation referencing a different signal strength measurement. Equation 8a shows this plurality of equations being aggregated via multiplication, resulting in a product of the probabilities. Each of the multiplied equations references a different signal strength measurement, as denoted by the SSi variable. As discussed above, the multiplication in this example is based on a probability of multiple uncorrelated events being a multiplication of all of the probability distribution functions of each one of these events. Of further note is that the probability distribution function is generated, in some examples, consistent with or analogous to, the example provided in Equations 8b-d discussed above.

In other examples, as described with respect to Equation 9, aggregation is accomplished by adding or summing log values of probabilities generated by the probability distribution functions of the measurement specific equations. This aggregation forms a second equation (e.g., Equation 9). The summation of log values is based on a mathematical equality that $\log (a*b)=\log(a)+\log(b)$. Probability distribution functions in these examples are also consistent with or analogous to the example provided by Equations 8b-8d, discussed above.

In some examples, based on the determined second equation (e.g., Equation 8a or Equation 9), LDS 170/350 generates a plurality of derivative equations with respect to each of the unknown states determined in operation 920. This plurality of derivative equations are analogous to, in some examples, one or more of Equations 11a-11e (or Equations 18a-18e). Note that while the example Equations 11a-11e (or Equations 18a-18c) are with respect to a set of example unknown states, other unknown state values are derived by other examples, as discussed above.

LDS 170/350 initializes unknown state values (928). In some examples, the initialization values are predefined. In some examples, the unknown state values are initialized to a most recent prior determination's values (e.g., values determined for time t−1 are used to initialize values for time t).

LDS 170/350 obtains derivative values with respect to each of a current iterations unknown state values (930). In some examples, LDS 170/350 determines values of derivative equations analogous to one or more of Equations 11a-11e (or Equations 18a-18c) based on a current iteration's values of those unknown parameters.

LDS 170/350 determines next iterations values of the unknown states (935). In some examples, determining next iterations values of the unknown states includes subtracting a product of multiplying a scaling factor by a derivative of the probability distribution function with respect to the said variable (unknown state) to a previous iterations value of the unknown state. For example, as illustrated with respect to Equations 12a-12d, a next iteration value (e.g., $X_{k+1}$) is determined by subtracting, from a previous iteration value (e.g., $x_k$), a step-size scaling constant (e.g., $\alpha$) multiplied by the derivative value of the unknown parameter determined in operation (930) (e.g., via an equation analogous to Equations 11a-11e or 18a-18c). Note that while the examples of Equations 12a-12d show derivatives with respect to coordinate values, an Intercept parameter, and a path loss exponent PLE parameter, other examples determine other unknown state values for the next iteration. These other unknown state values include, in various examples, but are not limited to, z coordinate value, a distribution function variance, receiver antenna gain value, transmitter antenna gain value, transmission power value, or other potentially unknown state values.

After values of the unknown states are determined (for this iteration), LDS 170/350 evaluates whether the gradient ascent has converged (940). Convergence of the gradient ascent method evaluates differences between estimated values of unknown states in a current iteration versus estimated values of those unknown states from a previous iteration. In some examples, each difference is compared against a threshold specific to the unknown state itself. If changes to the estimated parameters are each below their threshold, then the gradient descent has converged.

If the gradient ascent method has converged (YES branch of 940), LDS 170/350 evaluates whether the convergence includes errors (945). In some examples, the convergence criterion is met but values of the determined unknown states are out of an acceptable range of values (e.g., per Equation 21 above). If no error in the convergence is detected (NO branch of 945) LDS 170/350 the method 900 reports converged coordinate values (e.g., x, y, and optionally z) as a location of the wireless device (948). If an error was detected in the converged values (YES branch of 945), then process (900) moves to operation (955), discussed below.

If the gradient ascent method has not converged (NO branch of 940), LDS 170/350 determines if a terminating condition of the gradient ascent method has occurred (950). For example, some examples define a maximum number of iterations as a terminating condition. If that maximum number of iterations has been performed (YES branch of 950), LDS 170/350 assigns an alternative value for one or more unknown states to the state for the particular time period (955). In some examples, an alternative value is a most recently derived value of the unknown state (e.g., a value derived in a prior time period is used for the particular time period in some examples). In some examples, alternative location related unknown states (e.g., any one or more of an x, y, or z coordinates) is calculated based on a previous location and a velocity reported by the wireless device. In some examples, operation (955) uses a previously obtained PLF parameter(s) such as Int and/or PLE, and determines one or more location coordinates of the device based on the previously attained PLF parameters.

If no terminating condition has been reached (NO branch of 950), LDS 170/350 returns to operation (930), which determines updated derivative values based on the new unknown state values determined in the last iteration (930). Note that while example process (900) illustrates use of a gradient ascent or gradient ascent method for determining unknown state values, other examples determine maximum probability values or unknown state values resulting in a derivative of zero using other methods.

After execution of operation (948) or operation (955) is completed, example process (900) is complete (960). Note that LDS 170/350 may execute example process (900) iteratively or repetitively to derive one or more unknown states for a plurality of time periods, as represented by the variable t discussed above with respect to, for example, Equations 1-12.

FIG. 10 is an example data table 1000 that is used by one or more processors, such as one or more processors 396 of LDS 170/350, to determine a priority of unknown states in accordance with one or more techniques of the disclosure. Data table 1000 is one example implementation of unobserved states policy 384 as shown in FIG. 3B. Column 1020 of data table 1000 indicates a list of unknown parameters that can be selected for estimation. Row 1002 provides priorities for estimating the x coordinates of the wireless device. Row 1004 provides priorities for estimating y coordinates of the wireless device. Row 1006 provides priorities for estimating z coordinates of the wireless device. Row 1008 provides priorities for estimating an intercept parameter. Row 1010 provides priorities for estimating a path loss exponent parameter. Row 1012 provides priorities for estimating a variance parameter of a distribution function. Row 1014 provides priorities for estimating a mean parameter of a distribution function. Other examples implement tables having different priorities than those provided in the example of FIG. 10. For example, use of different types of probability distribution functions imply different unknown states, which would introduce a different set of unknown states than those illustrated in FIG. 10.

Columns 1022 through 1032 of data table 1000 provide a priority of each of the unknown parameters represented by the rows 1002-1014 based on a number of signal strength measurements available for a particular time period. For example, data table 1000 indicates that when two independent signal strength measurements are available (for a particular wireless device) within a particular time period, it is not possible to derive values for any unknown states. As such, the unknown states for that particular time period are assigned values based on previous (e.g., indicated by PREV) derivations of the x and y coordinate values (e.g., rows 1002 and 1004) along with the speed of the device (e.g., indicated by S) along these coordinates. Other unknown states are assigned constant or configured static values (e.g., indicated by "CONST") in the table.

When the three signal strength measurements are available for/in a particular time period, column 1024 indicates that unknown states for x and y location coordinates are determined (indicated by the character "H" for high priority) while other unknown states are assigned predefined constant or preconfigured values (e.g., indicated by "CONST") in the table.

When four signal strength measurements are available for/in a particular time period, column 1026 indicates that unknown states corresponding to an x and y location coordinate and a PLE parameter are determined. Other unknown states are assigned values based on predefined constants or predefined configured values. In some examples, the predefined constants or predefined configured values are stored in the data table 1000 itself.

When five signal strength measurements are available in/for a particular time period, column 1028 indicates unknown states corresponding to the x and y location coordinates as well as the PLE and an intercept parameter are determined. Other unknown states are assigned values via predefined constants or preconfigured values. As discussed above, in some examples, the predefined constants or predefined configured values are stored in the data table 1000 itself.

When six signal strength measurements are available in/for a particular time period, column 1030 indicates that unknown states corresponding to x, y, and z location coordinates as well as the PLE, and the intercept parameters should be determined. Other unknown states are assigned values based on predefined constants or preconfigured values. As discussed above, in some examples, the predefined constants or predefined configured values are stored in the data table 1000 itself.

When seven signal strength measurements are available, column 1032 indicates that the x, y, and z location coordinates as well as the PLE, the intercept, and the sigma parameters are determined. Other unknown states are assigned values based on predefined constants or configured values. As discussed above, in some examples, the predefined constants or predefined configured values are stored in the data table 1000 itself.

Figure 11:
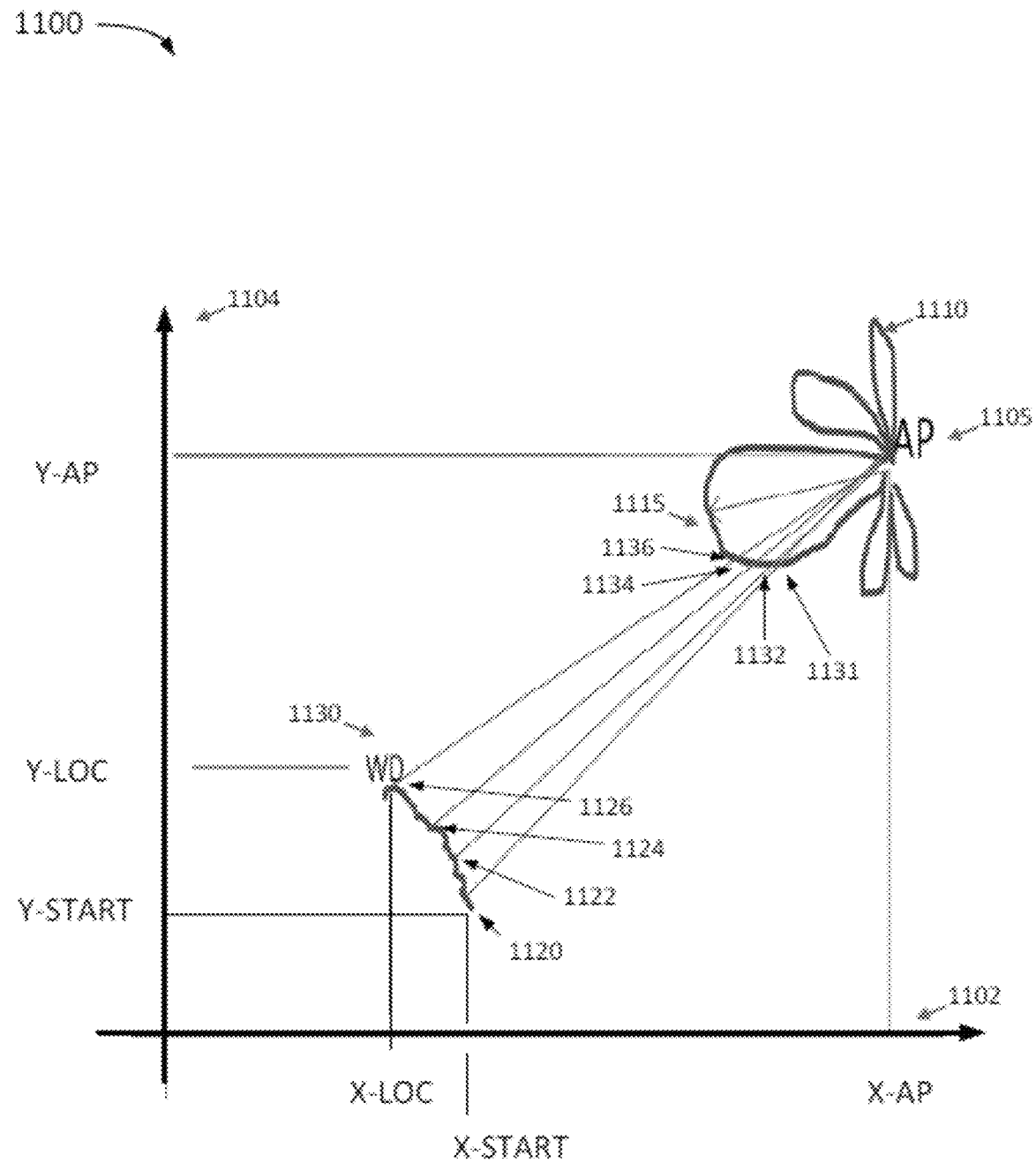
FIG. 11 a graph showing location estimates of a wireless device (WD) and a known location of an AP in accordance with one or more techniques of the disclosure.

FIG. 11 a graph 1100 showing location estimates of a wireless device (WD) 1130 and a known location of an AP 1105 in accordance with one or more techniques of the disclosure. AP 1105 is located at coordinates denoted x-AP and y-AP within a two dimensional space defined by an x-axis 1102 and a y axis 1104. The AP 1105 includes a transmitting antenna having a directional gain curve 1110. The directional gain curve 1110 shows a maximum gain at direction 1115, which is aligned with a direction in which the antenna is oriented. Wireless device (WD) 1130 is located at coordinates x-LOC and y-LOC.

As discussed above, at least some examples utilize a gradient ascent method to identify a location of maximum probability given values of unknown state variables, such as x, y, z coordinates of the wireless device 1130. FIG. 11 shows multiple location estimates 1120, 1122, 1124, and 1126 of the wireless device 1130 resulting from a hypothetical performance of such a gradient ascent method.

For each iteration of the gradient ascent method, a gain ($G_t$) of the transmit antenna of the AP 1105 is determined based on the iteration's values of the wireless device 130's x and y coordinates. Thus, each of the multiple location estimates 1120, 1122, 1124, 1126, has a corresponding transmitter antenna gain Gt estimate associated with it, shown respectively on the directional gain curve 1110 as points 1131, 1132, 1134, and 1136.

FIGS. 12A, 12B and 13A, 13B show test results illustrating advantages of the disclosed examples in accordance with one or more techniques of the disclosure. The test is conducted in a commercial environment that includes a plurality of access points. Multiple known test locations with predetermined know locations are established. When the test is performed, a wireless device is moved to each of the multiple test points. At each test point, signal strength measurements of signals generated by each of the plurality of access points are obtained.

The wireless device then transmits these signal strength measurements to an example LDS, such as LDS 170/350. The LDS uses the signal strength measurements to determine a location estimate for the wireless device. For example, the LDS performs the method 900 discussed above with respect to FIG. 9 in at least some examples.

Figure 12A:
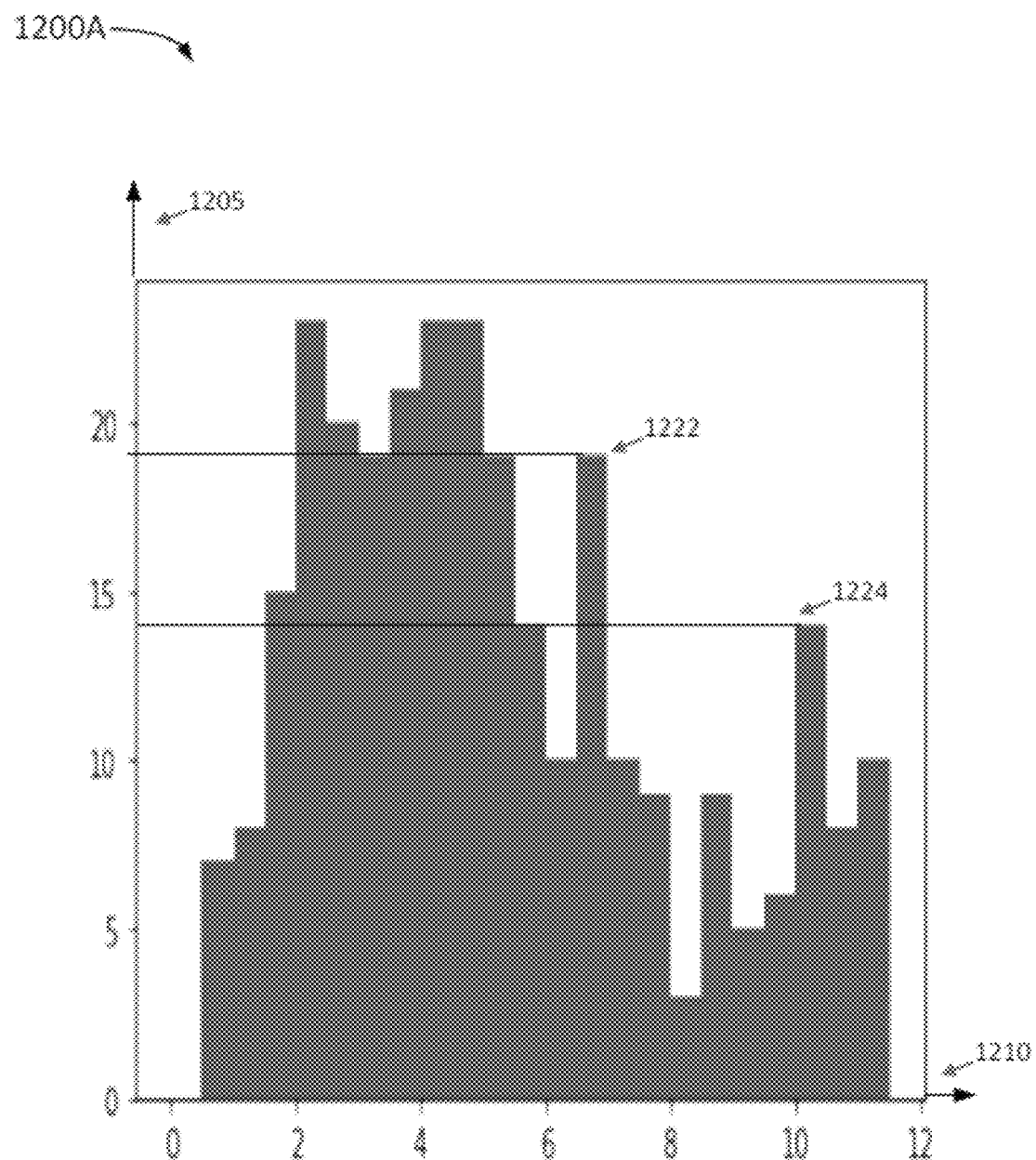
FIG. 12A is an example histogram showing a distribution of location error in an example that does not rely on derived antenna gain information.
Figure 12B:
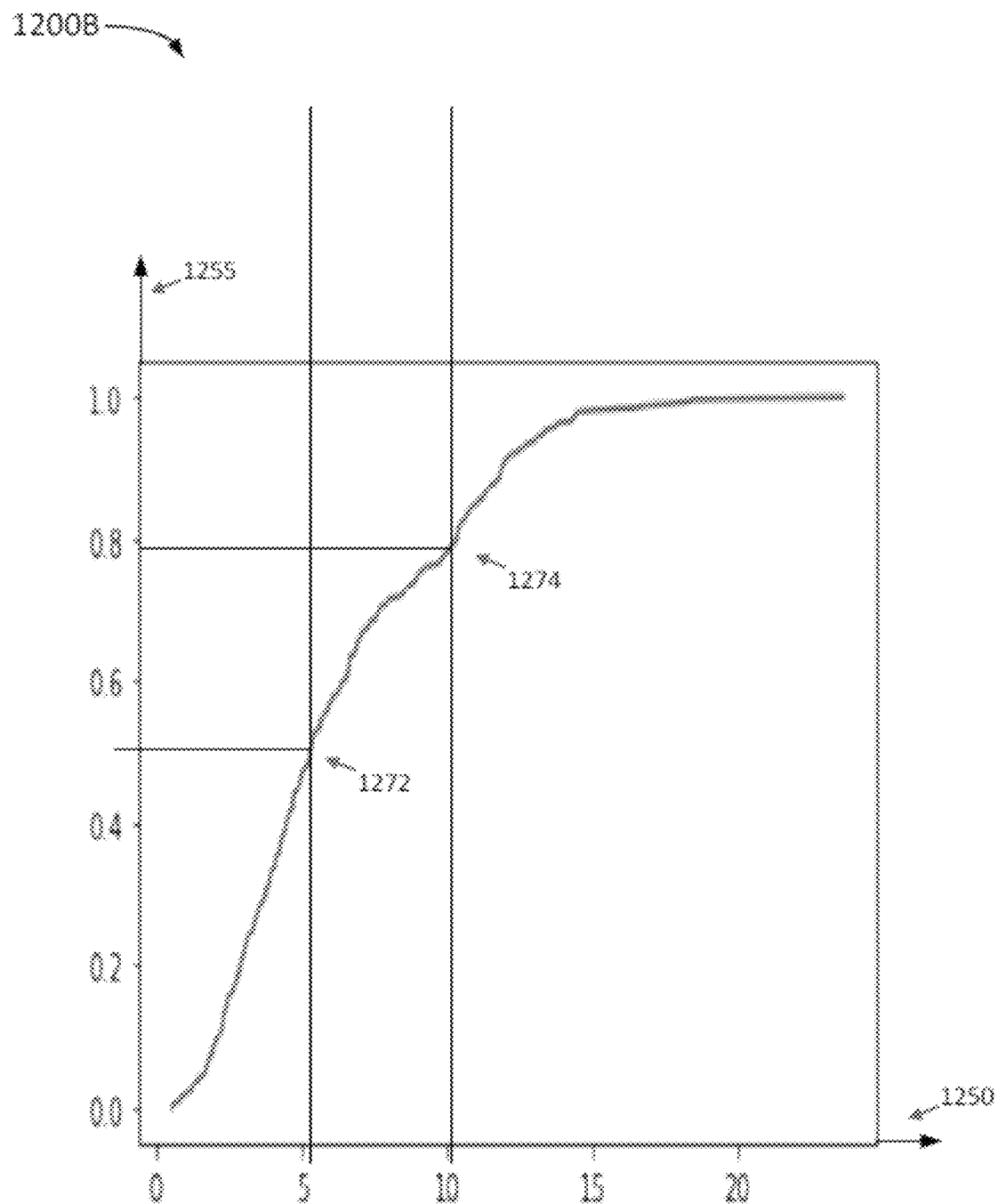
FIG. 12B is a graph showing cumulative location error probability distribution performed without using antenna gain information.

A location estimation error is then determined by comparing the estimated location to the known test point location. To generate the illustrated results, two tests are performed. A first test estimates an Intercept parameter, such as the Int of Equation 16. Results of the location estimation are shown in FIGS. 12A-B. A second test estimates the intercept IntPtGr* of Equation 17a. As discussed above, this second test computes a transmit antenna gain (Gt) based on the estimated position of the wireless device (e.g., (x, y) or (rx, ry) at each iteration of the gradient ascent. Results of this second test are illustrated in FIGS. 13A-B.

FIG. 12A is a histogram 1200A of location error when the location is estimated without using antenna gain information. The x axis 1210 indicates the error, in meters, between a test point's known location coordinates and the location estimated by the LDS 170/350 using the techniques of the disclosure. The y axis 1205 indicates a number of occurrences of a specific error value determined from the test results. For example, the histogram point 1222 shows that an error of seven meters occurred nineteen times during the test. The histogram point 1224 shows that an error of ten and a half meters occurred fourteen times during the test.

FIG. 12B is a graph 1200B of a cumulative location error probability distribution function of an example that determines location estimates without deriving transmit antenna gain information. In the graph 1200B, the x axis 1250 indicates a location error value. The y axis 1255 indicates a probability that the location estimation error value is below a given value (e.g., specified by the x axis 1250). Point 1272 indicates a probability that, in these examples, the location estimation error is below 5 meters is ~0.5 (or 50%). Point 1274 indicates that, in these examples, a probability of the location estimation error being below 10 meters is 0.8 (or 80%).

Figure 13A:
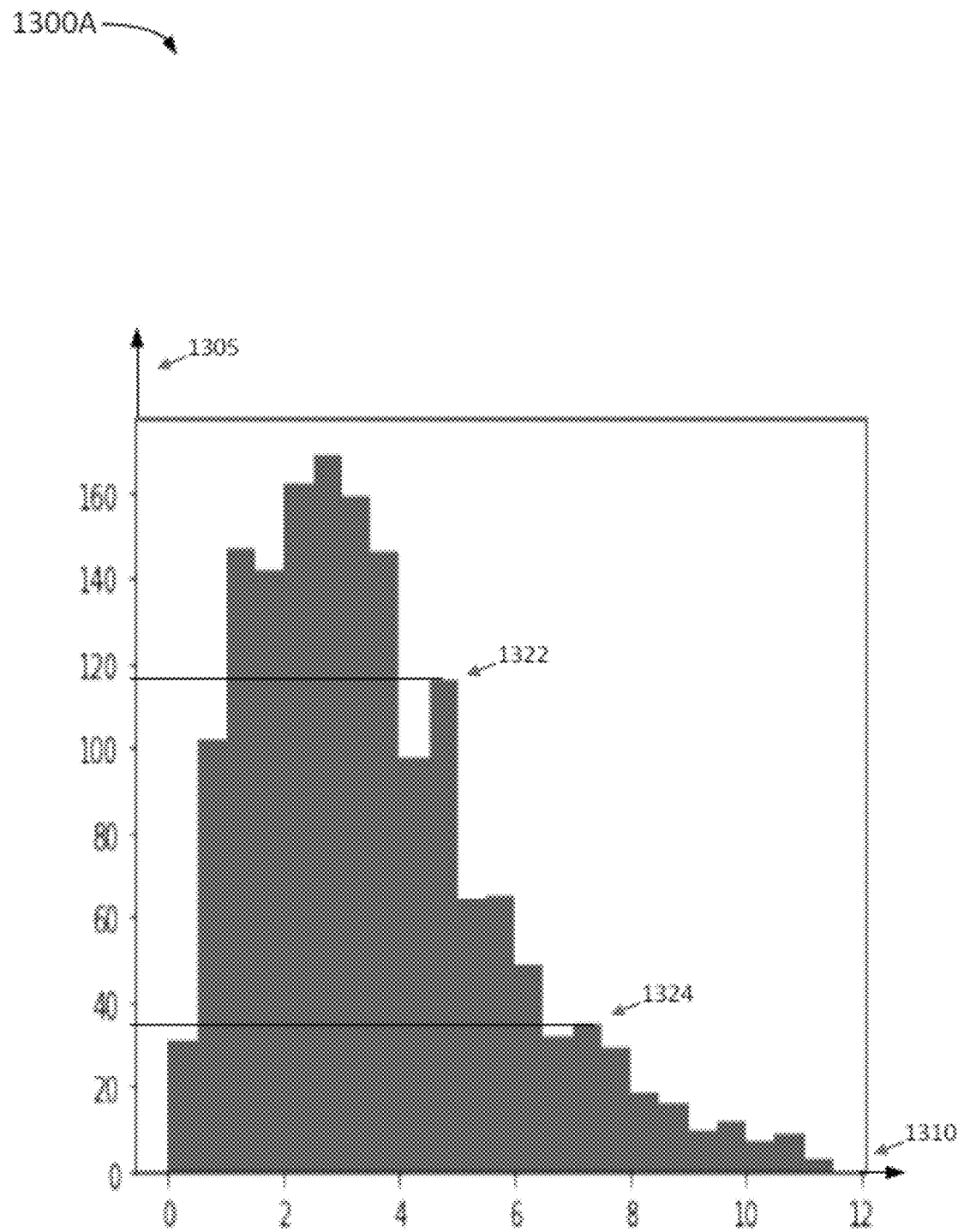
FIG. 13A is an example histogram showing a distribution of location error in an example that derives antenna gain information, in accordance with one or more techniques of the disclosure.
Figure 13B:
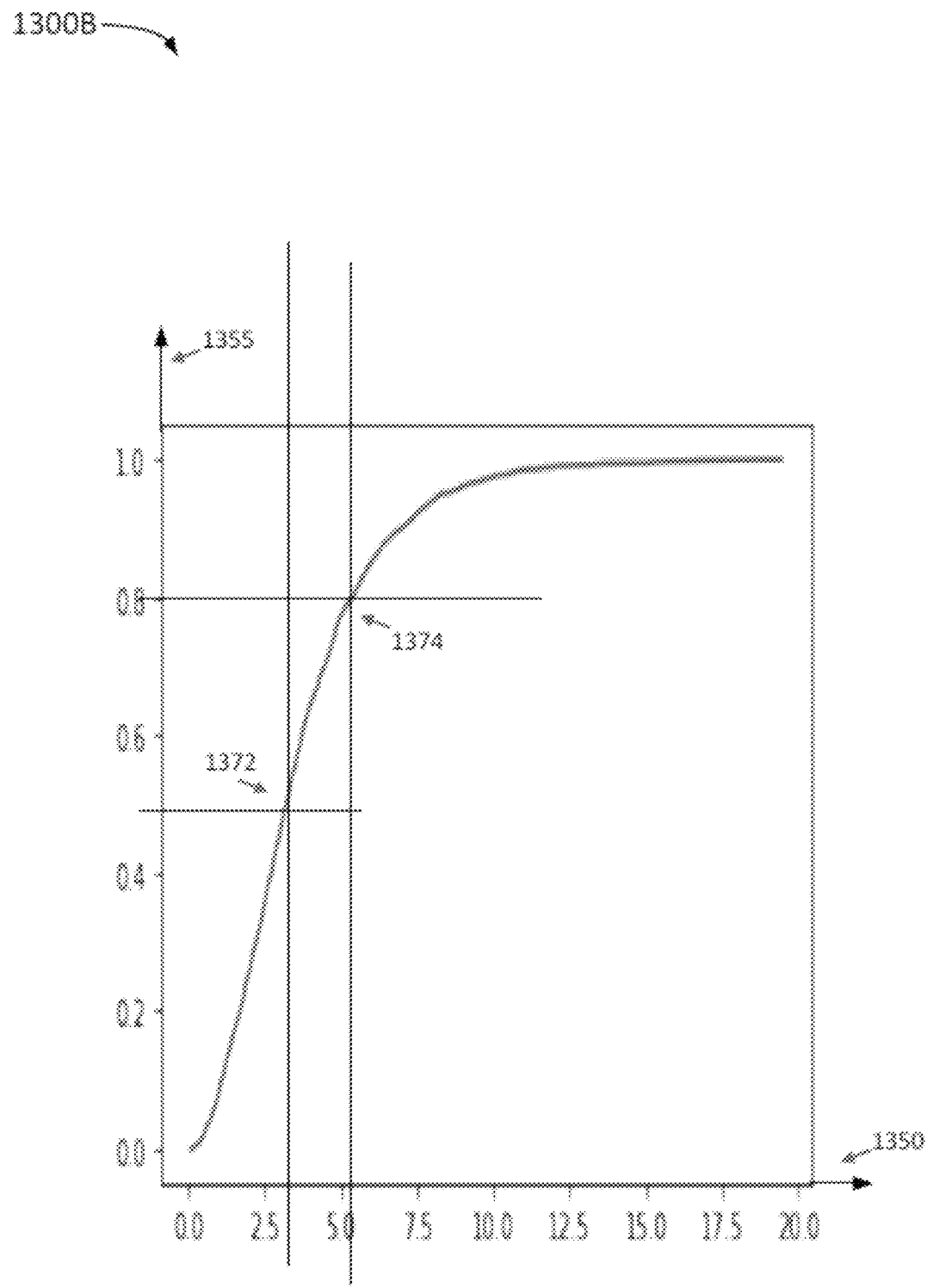
FIG. 13B is a graph of cumulative location error probability distribution in an example that derives antenna gain information, in accordance with one or more techniques of the disclosure.

FIG. 13A is a histogram 1300A of location errors generated by examples that derive transmit antenna gain information and use that transmit antenna gain information to estimate location coordinates of a wireless device, in accordance with one or more techniques of the disclosure. The x axis 1310 indicates the error value, in meters. The y axis 1305 indicates a number of occurrences of the error value indicated by the x axis 1310. For example, the point 1322 illustrates that an error value of 5 meters occurred 118 times during the test. The point 1324 illustrates an error value of seven meters occurred 38 times during the test.

FIG. 13B is a graph 1300B showing a cumulative location error probability distribution resulting from examples that derive transmit antenna gain information, in accordance with one or more techniques of the disclosure. The x axis 1350 indicates error between a test point's known location and the location estimated by the LDS. The y axis 1355 indicates a probability of the location estimation error being below a given value. For example, point 1372 indicates that the test demonstrated a probability of the location estimation error being below three meters is 0.5(or 50%). Point 1374 indicates that the test demonstrated a probability that the location estimation error was below 5.1 meters is 0.8 (or 80%).

Comparing the test results shown in FIG. 12A with those of FIG. 13A, and the test results shown in FIG. 12B with those of FIG. 13B, a reduced cumulative error results from deriving transmit antenna gain information, and utilizing the derived transmit antenna gain information to derive location coordinates of the wireless device. For example, while examples not considering transmit antenna gain information show a probability of a location error being lower than ten meters as 0.8 (e.g., see point 1274), examples that derive transmit antenna gain information and use that gain information to determine location estimates for a wireless device have a probability that a location error is below ~six meters at 0.8. Thus, examples that derive transmit antenna gain information show substantial improvements in location estimate accuracy.

Examples, as described herein, includes, or operates on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software resides on a machine readable medium. In an example, the software, when executed by the underlying hardware of the module, causes the hardware to perform the specified operations.

The techniques of various examples are implemented using software, hardware and/or a combination of software and hardware. Various examples are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various examples are also directed to methods, e.g., method of controlling and/or operating a communications device or devices, e.g., a network management node, an access point, wireless terminals (WT), user equipment (UEs), base stations, control nodes, DHCP nodes, DNS servers, AAA nodes, Mobility Management Entities (MMEs), networks, and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes are rearranged while remaining within the scope of the present disclosure. The accompanying method claims present elements of the various steps in a sample order, and are not meant to be limited to the specific order or hierarchy presented.

In various examples devices and nodes described herein are implemented using one or more modules to perform the steps corresponding to one or more methods, for example, signal generation, transmitting, processing, analyzing, and/or receiving steps. Thus, in some examples various features are implemented using modules. Such modules are implemented, in at least some examples, using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple or all of the operations of the disclosed examples.

In some examples, the processor or processors, e.g., CPUs, of one or more devices, e.g., communications devices such as routers, switches, network attached servers, network management nodes, wireless terminals (UEs), and/or access nodes, are configured to perform the steps of the methods described as being performed by the devices. The configuration of the processor is achieved, in at least some examples, by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules are implemented, in at least some examples, purely in hardware, e.g., as circuits, or implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. Depending on the example, the computer program product can, and sometimes does, include different code for each step to be performed. Thus, the computer program product includes, in at least some examples, code for each individual step of a method, e.g., a method of operating a communications device, e.g., a network management node, an access point, a base station, a wireless terminal or node. The code is in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, configured to implement some or all of the steps of the methods described herein. The processor is for use in, e.g., a communications device or other device described in the present application.

While described in the context of a communications system including wired, optical, cellular, Wi-Fi, Bluetooth and BLE, at least some of the methods and apparatus of various examples are applicable to a wide range of communications systems including IP and non IP based, OFDM and non-OFDM and/or non-cellular systems.

Numerous additional variations on the methods and apparatus of the various examples described above will be apparent to those skilled in the art in view of the above description. Such variations are to be considered within the scope. The methods and apparatus are used, in at least some examples, with IP based and non-IP, wired and wireless such CDMA, orthogonal frequency division multiplexing (OFDM), Wi-Fi, Bluetooth, BLE, optical and/or various other types of communications techniques which are used, in at least some examples, to provide communications links between network attached or associated devices or other devices including receiver/transmitter circuits and logic and/or routines, for implementing the methods.

Although the discussion above describes, in some instances, determining location of a wireless terminal in a two-dimensional space, the features described above are applied, in at least some examples, equally to locating a wireless terminal in a three-dimensional space. As such, in a three-dimensional space, rather than determining a location of a WT in a specific cell or region, some of the disclosed examples determine a location of a WT within a three-dimensional region when considering a plurality of three-dimensional regions.

What is claimed is:

1. A method, comprising:
generating, by one or more processors, based on one or more signal strength measurements of signals received by a wireless device, a probability distribution function indicative of a probability that the wireless device is in a location, the probability distribution function including a set of unknown path loss function parameters;
identifying, by the one or more processors, based on a priority for each unknown path loss function parameter of the set of unknown path loss function parameters, one or more unknown path loss function parameters of the set of unknown path loss function parameters to derive;
deriving, by the one or more processors, based on the probability distribution function and the priority for each unknown path loss function parameter of the set of unknown path loss function parameters, a value for each of the one or more unknown path loss function parameters of the set of unknown path loss function parameters;
determining, by the one or more processors, the location of the wireless device based on the value for each of the one or more unknown path loss function parameters of the set of unknown path loss function parameters; and
generating an output indicating the location of the wireless device.

2. The method of claim 1, wherein the priority for each unknown path loss function parameter of the set of unknown path loss function parameters is determined, by the one or more processors, based on whether the wireless device receives a number of signal strength measurements less than or equal to a number of unknown path loss function parameters of the set of unknown path loss function parameters.

3. The method of claim 1, wherein the priority for each unknown path loss function parameter of the set of unknown path loss function parameters is based on a number of the signal strength measurements for a particular time period.

4. The method of claim 1, wherein the value of one of the one or more unknown path loss function parameters of the set of unknown path loss function parameters comprises a previously derived value.

5. The method of claim 1, wherein the value of one of the one or more unknown path loss function parameters of the set of unknown path loss function parameters comprises a constant or configured static value.

6. The method of claim 1, wherein determining the location of the wireless device further comprises, for each of a plurality of locations of the wireless device, aggregating log values of the probability that the wireless device is in each of the plurality of locations.

7. The method of claim 6, wherein determining the location of the wireless device further comprises identifying the location of the wireless device based on the aggregated log values that are maximized.

8. The method of claim 1, wherein the set of unknown path loss function parameters comprises an intercept parameter and a path loss exponent parameter, and wherein the intercept parameter further comprises one or more of a transmit power parameter, a receiving antenna gain parameter, or a transmit antenna gain parameter.

9. The method of claim 1, further comprising automatically invoking one or more actions based on the location of the wireless device.

10. The method of claim 1, further comprising providing one or more location services to the wireless device based on the location of the wireless device.

11. A system, comprising:
one or more processors; and
one or more memories storing instructions that when executed configure the one or more processors to:
generate, based on one or more signal strength measurements of signals received by a wireless device, a probability distribution function indicative of a probability that the wireless device is in a location, the probability distribution function including a set of unknown path loss function parameters;
identify, based on a priority for each unknown path loss function parameter of the set of unknown path loss function parameters, one or more unknown path loss function parameters of the set of unknown path loss function parameters to derive;
derive, based on the probability distribution function and the priority for each unknown path loss function parameter of the set of unknown path loss function parameters, a value for each of the one or more unknown path loss function parameters of the set of unknown path loss function parameters;
determine the location of the wireless device based on the value for each of the one or more unknown path loss function parameters of the set of unknown path loss function parameters; and
generate an output indicating the location of the wireless device.

12. The system of claim 11, wherein the priority for each unknown path loss function parameter of the set of unknown path loss function parameters is determined based on whether the wireless device receives a number of signal strength measurements less than or equal to a number of unknown path loss function parameters of the set of unknown path loss function parameters.

13. The system of claim 11, wherein the priority for each unknown path loss function parameter of the set of unknown path loss function parameters is based on a number of the signal strength measurements for a particular time period.

14. The system of claim 11, wherein the value of one of the one or more unknown path loss function parameters of the set of unknown path loss function parameters comprises a previously derived value.

15. The system of claim 11, wherein the value of one of the one or more unknown path loss function parameters of the set of unknown path loss function parameters comprises a constant or configured static value.

16. The system of claim 11, wherein the one or more memories further store instructions that when executed configure the one or more processors to:
for each of a plurality of locations of the wireless device, aggregate log values of the probability that the wireless device is in each of the plurality of locations.

17. The system of claim 16, wherein to determine the location of the wireless device, the one or more memories further store instructions that when executed configure the one or more processors to:
- identify the location of the wireless device based on the aggregated log values that are maximized.

18. The system of claim 11, wherein the set of unknown path loss function parameters comprises an intercept parameter and a path loss exponent parameter, and wherein the intercept parameter further comprises one or more of a transmit power parameter, a receiving antenna gain parameter, or a transmit antenna gain parameter.

19. Non-transitory computer readable storage media comprising instructions that, when executed, configure processing circuitry to:
- generate, based on one or more signal strength measurements of signals received by a wireless device, a probability distribution function indicative of a probability that the wireless device is in a location, the probability distribution function including a set of unknown path loss function parameters;
- identify, based on a priority for each unknown path loss function parameter of the set of unknown path loss function parameters, one or more unknown path loss function parameters of the set of unknown path loss function parameters to derive;
- derive, based on the probability distribution function and the priority for each unknown path loss function parameter of the set of unknown path loss function parameters, a value for each of the one or more unknown path loss function parameters of the set of unknown path loss function parameters;
- determine, the location of the wireless device based on the value for each of the one or more unknown path loss function parameters of the set of unknown path loss function parameters; and
- generate an output indicating the location of the wireless device.

20. The non-transitory computer readable storage media of claim 19, wherein the priority for each unknown path loss function parameter of the set of unknown path loss function parameters is determined based on whether the wireless device receives a number of signal strength measurements less than or equal to a number of unknown path loss function parameters of the set of unknown path loss function parameters.

\* \* \* \* \*